(12) United States Patent
Koh et al.

(10) Patent No.: US 12,363,265 B2
(45) Date of Patent: Jul. 15, 2025

(54) VEHICLE PROJECTOR DEVICE, VEHICLE CABIN SYSTEM COMPRISING SAME, AND METHOD FOR ADJUSTING PROJECTION IMAGE POSITION

(71) Applicant: LG ELECTRONICS INC., Seoul (KR)

(72) Inventors: Sunggyu Koh, Seoul (KR); Sehdong Yoo, Seoul (KR); Kyoungjoung Kim, Seoul (KR); Sungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 17/997,014

(22) PCT Filed: Apr. 21, 2021

(86) PCT No.: PCT/KR2021/005002
§ 371 (c)(1),
(2) Date: Oct. 24, 2022

(87) PCT Pub. No.: WO2021/230517
PCT Pub. Date: Nov. 18, 2021

(65) Prior Publication Data
US 2023/0179748 A1 Jun. 8, 2023

(30) Foreign Application Priority Data
May 14, 2020 (KR) .................. 10-2020-0057871

(51) Int. Cl.
*H04N 9/31* (2006.01)
(52) U.S. Cl.
CPC ......... *H04N 9/3141* (2013.01); *H04N 9/3185* (2013.01)

(58) Field of Classification Search
CPC ........ G03B 21/14; G03B 21/28; G03B 21/30; G03B 21/43; G03B 21/142; G03B 21/145;
(Continued)

(56) References Cited

U.S. PATENT DOCUMENTS

| 2014/0168608 A1* | 6/2014 | Disley ................ G03B 29/00 352/132 |
| 2016/0109939 A1* | 4/2016 | Lee ..................... B60R 11/04 345/7 |

(Continued)

FOREIGN PATENT DOCUMENTS

| JP | 2016009100 | 1/2016 |
| JP | 2019048578 | 3/2019 |

(Continued)

OTHER PUBLICATIONS

PCT International Application No. PCT/KR2021/005002, International Search Report dated Aug. 18, 2021, 2 pages.

*Primary Examiner* — Sultan Chowdhury
(74) *Attorney, Agent, or Firm* — LEE, HONG, DEGERMAN, KANG & WAIMEY

(57) ABSTRACT

The present invention provides a vehicle projector device installed inside a vehicle, a vehicle cabin system comprising same, and a method for adjusting the position of a projection image of a projecting module installed inside the vehicle, the vehicle projector device comprising: an armrest having a top cover; and the projecting module that is installed in the armrest to be rotatable and enables adjustment of a projection area to project an image toward the ceiling and rear of the interior of the vehicle.

25 Claims, 21 Drawing Sheets

(58) Field of Classification Search
CPC .... H04N 9/312; H04N 9/3141; H04N 9/3152; H04N 9/3173; H04N 9/3185; B60K 35/00; B60K 35/22; B60K 35/223; B60R 2011/0007; B60R 2011/0082; B60R 2011/0085; B60R 2011/0092; B60R 2011/0094

See application file for complete search history.

(56) References Cited

U.S. PATENT DOCUMENTS

| | | | | |
|---|---|---|---|---|
| 2018/0024359 | A1* | 1/2018 | Yoneyama | G02B 27/1066 345/9 |
| 2018/0086260 | A1 | 3/2018 | Barillot et al. | |
| 2019/0232786 | A1* | 8/2019 | Sasaki | G06F 3/013 |
| 2021/0382379 | A1* | 12/2021 | Lachaumette | G09F 19/18 |

FOREIGN PATENT DOCUMENTS

| | | |
|---|---|---|
| KR | 1020050017020 | 2/2005 |
| WO | 2020032304 | 2/2020 |

\* cited by examiner

VEHICLE PROJECTOR DEVICE, VEHICLE CABIN SYSTEM COMPRISING SAME, AND METHOD FOR ADJUSTING PROJECTION IMAGE POSITION

CROSS-REFERENCE TO RELATED APPLICATION(S)

This application is the National Stage filing under 35 U.S.C. 371 of International Application No. PCT/KR2021/005002, filed on Apr. 21, 2021, which claims the benefit of earlier filing date and right of priority to Korean Application No. 10-2020-0057871, filed on May 14, 2020, the contents of which are all incorporated by reference herein in their entirety.

TECHNICAL FIELD

The present disclosure relates to a vehicle projector device capable of adjusting a position of an image projected from a projector device inside a vehicle, a vehicle cabin system including the same, and a method for adjusting a projection image position.

BACKGROUND ART

As automobiles are widely used for recreational purposes, various functions are added. Among them, a beam projector is popular because it allows a user to enjoy images with a driver, while taking a break outdoors or while driving.

A beam projector, as an image output device for magnifying and outputting an image on a wall or a screen, is mainly used when configuring a home theater or holding a conference or presentation.

The beam projector includes a digital light processing (DLP) method, a liquid crystal display (LCD) method, and a liquid crystal on silicon (LCoS) method depending on a product.

Recently, such a beam projector is installed inside an automobile and is used in various ways.

A conventional projector has a simple box shape and has a problem in that it is difficult to apply a scene using various oblique protrusions, particularly in the interior of a vehicle.

In addition, the projector of the related art does not have a separate handle, so there is a problem that it is inconvenient to use while moving, and there is also a problem of damage when dropped.

DISCLOSURE OF INVENTION

Technical Problem

Therefore, to obviate those problems, an aspect of the detailed description is to provide a projector device which has various projection angles by an armrest and a projecting module that projects an image toward the ceiling and rear of the interior of a vehicle and which is easily handled to enable protrusion on a desired place.

Another aspect of the detailed description is to provide a projector device that enables convenient viewing through manual control or automatic control.

Another aspect of the detailed description is to provide a projector device having a structure which is movable and convenient to use by a separate handle.

Solution to Problem

To achieve these and other advantages and in accordance with the purpose of the present disclosure, as embodied and broadly described herein, there is provided a vehicle projector device installed inside a vehicle, including an armrest having a top cover; and a projecting module that is installed in the armrest to be rotatable and enables adjustment of a protrusion area to project an image toward the ceiling and rear of the interior of the vehicle.

The vehicle projector device may further include a built-in housing installed on the top cover and having an accommodating portion in which the projecting module is installed, wherein the built-in housing includes a housing cover installed to be rotatable on one surface of the built-in housing.

The built-in housing may further include a rotating mirror unit installed in the built-in housing and having a rotatable mirror unit for reflecting the image projected from the projecting module toward the front or rear of the vehicle, the rotating mirror unit, wherein the rotating mirror unit may include a button connected to the mirror unit to be linearly movable in one direction to enable a rotational movement of the mirror unit.

The rotating mirror unit may include: a rotating shaft connected to one side of the mirror unit to form a rotation center during rotation of the mirror unit; a guide rail configured on one surface of the button and having a guide groove configured in a direction intersecting one direction in which the button linearly moves; and a rotating link rotatably installed between the rotating shaft and the guide groove and rotating by a linear movement of the button to transmit rotational force to the rotating shaft.

According to an example related to the present disclosure, the rotating link may include: an accommodating hole configured on one side of the rotating link to rotatably accommodate one side of the rotating shaft; and a guide protrusion configured to protrude from the other side of the rotating link and installed in the guide groove.

A button movement guide enabling the button to move in one direction by a predetermined distance may be installed inside the built-in housing.

A button movement guide for enabling the button to move in one direction by a predetermined distance may be installed inside the built-in housing, and, according to the movement of the button in the button movement guide, the guide protrusion may move up and down in the guide groove and the rotating link may rotate together with the rotating shaft.

The vehicle projector device may further include: a vehicle controller configured to obtain vehicle-related information; an interface unit configured to receive the obtained vehicle-related information; and a projector controller configured to receive the vehicle-related information from the interface unit and control an image protrusion direction of the projecting module.

The vehicle-related information may include at least one of seat position information of the vehicle, screen position information for light irradiation, and passenger-related information.

The armrest may further include a body having a projector accommodating space in which the projecting module is installed, and the top cover of the armrest may be configured such that at least a portion thereof is rotatably opened by a user's manual operation.

The top cover of the armrest may include: a first side cover installed on the body to form a portion of the top cover and rotating about one side of the body; and a second side cover installed on the body to form another portion of the top cover and rotating about the other side of the body.

The armrest may further include an opening button installed on the body, pressing the first and second side covers to form a top cover surface of the armrest, and rotated by releasing the pressing of the first and second side covers by a user's manual operation to enable opening of the projector accommodating space.

According to another example related to the present disclosure, the vehicle projector device may further include: a tilt mirror unit installed on the body and disposed to be inclined by a predetermined angle with respect to the projecting module so that a path of an image projected by the projecting module is changed toward the ceiling of the interior of the vehicle.

According to another example related to the present disclosure, the vehicle projector device may further include: a lifting member configured to lift and lower the projecting module so that a relative distance between the projecting module and the body is adjusted to project an image toward the rear of the interior of the vehicle.

The lifting member may include a bracket installed on at least one surface of the projecting module to support the projecting module; and a distance adjusting link rotatably installed between the bracket and the body to adjust a relative distance between the bracket and the body.

The lifting member may further include a step motor installed between the body and the distance adjusting link to adjust a rotation angle of the distance adjusting link.

According to another example related to the present disclosure, the vehicle projector device may further include a rotating support configured to rotatably support the projecting module and disposed at a position inside the vehicle.

A rotating bracket configured to rotate in one direction intersecting an inner periphery of the rotating support, as a rotation axis, and support the projecting module may be installed in the periphery of the rotating support.

Rotating support bosses forming a rotation center may be provided on both sides of the rotating bracket, and rotation holes for rotatably accommodating the rotating support bosses may be provided on both sides of the rotating support.

In addition, a step motor may be installed on an inner periphery of the rotating support boss to enable rotation of the rotating bracket.

In order to solve the above problems, a vehicle cabin system includes: the vehicle projector device described above; and a plurality of seats to which the projector device is connected.

In order to solve the above problems, a method for adjusting a projection image position, as a method for adjusting a projection image position of a projecting module installed inside a vehicle, includes: checking a front seat, a back seat and a current position; pressing a button of a projecting module; and adjusting a position of a projection image of the projecting module when the button is pressed.

According to an example related to the present disclosure, the method for adjusting a projection image position may further include: if the button is not pressed, maintaining a mirror unit angle at the current position and turning off the projecting module.

According to another example related to the present disclosure, the method for adjusting a projection image position may further include: when the button is pressed and the front seat is laid down, adjusting the projection position of the image of the projecting module to be adjusted to a ceiling of the vehicle and turning on the projector; and when the button is pressed and the back seat is folded, adjusting the projection position of the image of the projecting module to be projected to the rear of the vehicle and turning on the projector.

According to another example related to the present disclosure, the method for adjusting a projection image position may further include: when the button is pressed and the front seat is laid down, turning on the projector as a top cover of the armrest is opened; and when the button is pressed and the back seat is folded, turning on the projector after the position is moved to a set value of a projection position of the image of the projecting module.

Advantageous Effects of Invention

In accordance with the detailed description, in the vehicle projector device of the present disclosure, based on whether or not the screen is lowered at the rear, if the screen is lowered at the rear, the projecting module is output to the rear of the interior of the vehicle.

In addition, the vehicle projector device according to the present disclosure may determine an output direction by automatically searching for a gaze direction of a passenger or an area not covered by the passenger.

In addition, in the vehicle projector device of the present disclosure, the button may be guided to move in one direction on the button movement guide, the guide protrusion of the rotating link may move up and down in the guide groove by the movement of the button, and the rotating link may rotate together with the rotating shaft.

In addition, in the vehicle projector device of the present disclosure, the mirror unit may be rotated within a predetermined angle range, so that a position of an image projected from the projecting module may be adjusted.

MODE FOR THE INVENTION

Figure 1:
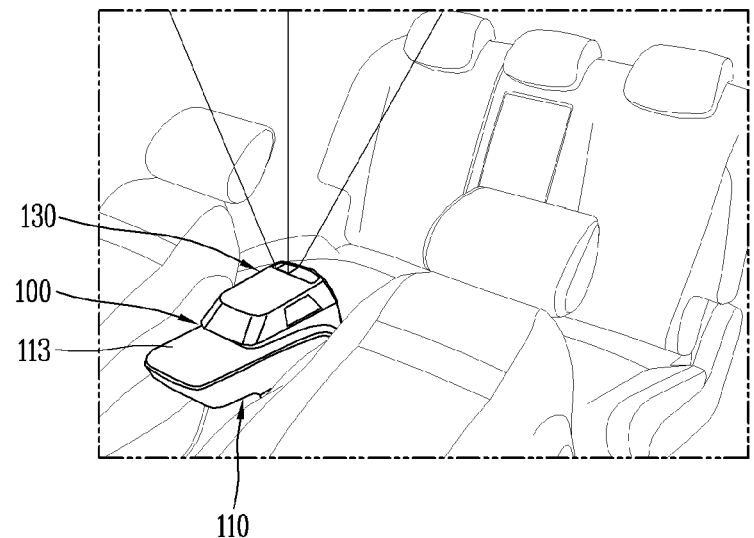
FIG. 1 is a perspective view illustrating an example of projecting an image toward a ceiling of the interior of a vehicle by a vehicle projector device according to a first embodiment of the present disclosure.

In the present disclosure, the same reference numerals are given to the same or similar components in the different embodiments, and a redundant description thereof will be omitted.

In addition, the structure applied to any one embodiment may be applied in the same manner to another embodiment as long as the different embodiments are not structurally and functionally inconsistent.

A singular representation may include a plural representation unless it represents a definitely different meaning from the context.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Since the vehicle projector device 100, 200, or 300 of the present disclosure have various projection angles and may be easily handled, a user may view an optimal image in a vehicle.

In addition, the vehicle projector device 100, 200, or 300 of the present disclosure may be attached to an armrest 110, 210, or 310 of the vehicle or may provide various scenes to a user using the structure of the armrest 110, 210, or 310, as will be described later.

In addition, the vehicle projector device 100, 200, or 300 of the present disclosure may have various projection angles and may be easily handled to project an image on a desired place.

Meanwhile, the vehicle projector device 100, 200, or 300 of the present disclosure enable convenient viewing through manual control or automatic control, and such a control method will be described later.

The vehicle projector device 100, 200, or 300 of the present disclosure includes an armrest 110, 210, or 310 and a projecting module 120, 220, or 320.

The vehicle projector device 100, 200, or 300 according to the present disclosure is installed inside a vehicle.

The armrest 110, 210, or 310 includes a top cover 113, 213, or 313.

The projecting module 120, 220, or 320 is rotatably installed on the armrest 110, 210, or 310 to project an image toward the ceiling and rear of the interior of the vehicle.

For example, the projecting module 120, 220, or 320 may include a control panel including a projector operation button, a remote sensor that receives an infrared signal output from a remote controller and remotely activates a function of a projector, a power switch that turns on or off the projector, a connector panel that connects the projector to various video devices such as DVD players, camcorders, and VCRs, a computer connector that connects the projector to a computer, a mouse port as a connector that connects the projector and a mouse or a mouse port of a computer, and a lens that is an optical system including a lens that enlarges an image to be projected on a screen and transmits the enlarged image and is fixed to a mount.

The vehicle projector device 100, 200, or 300 of the present disclosure may largely include three embodiments.

The three embodiments may include two built-in structures in which the vehicle projector device 100, 200, or 300 of the present disclosure is built therein and one external structure.

The vehicle projecting modules 120 and 220 of first and second embodiments may have a built-in structure, and the vehicle projecting modules 320 of a third embodiment may have an external structure.

The vehicle projecting modules 120 and 220 having a built-in structure include a structural feature for manually or automatically controlling a mirror, a feature for enabling the projecting module 120, 220 or 320 to move by rotating a configuration of a link, etc., which will be described later in detail with respect to the description of the first and second embodiments.

In addition, the vehicle projecting module 320 having an external structure includes features of a manual free-stop structure and an automatic motor structure, which will also be described later in detail with respect to the description of the third embodiment.

Hereinafter, the vehicle projector device 100 according to the first embodiment will be described with reference to FIGS. 1 to 16.

Figure 2:
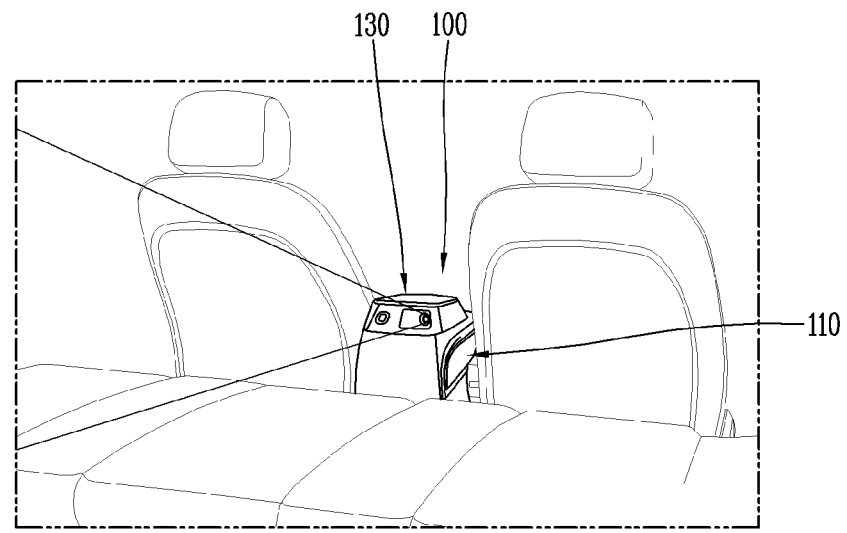
FIG. 2 is a perspective view illustrating an example of projecting an image toward the rear of the vehicle interior by a vehicle projector device according to the first embodiment of the present disclosure.
Figure 3:
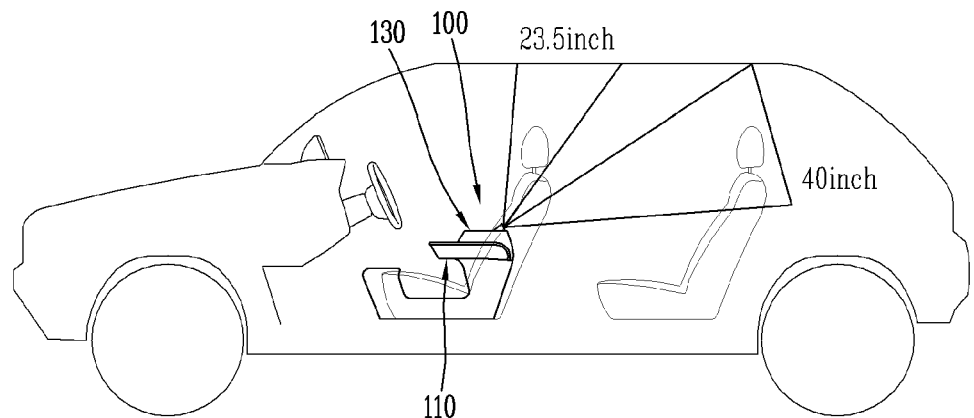
FIG. 3 is a side view schematically illustrating an example of projecting an image inside a vehicle in FIGS. 1 and 2.

FIG. 1 is a perspective view illustrating an example of projecting an image toward a ceiling of the interior of a vehicle by a vehicle projector device 100 according to a first embodiment of the present disclosure, FIG. 2 is a perspective view illustrating an example of projecting an image toward the rear of the vehicle interior by the vehicle projector device 100 according to the first embodiment of the present disclosure, and FIG. 3 is a side view schematically illustrating an example of projecting an image inside a vehicle in FIGS. 1 and 2.

In FIGS. 1 and 2, an example of projecting an image toward the ceiling and rear of the interior of the vehicle by the vehicle projector device 100 according to the first embodiment is shown.

In addition, FIG. 3 schematically shows an example in which an image is projected by the vehicle projector device 100 according to the first embodiment, showing an example in which an image is projected by the projecting module 120 at a projection angle of 23.5 inches in the direction of the ceiling of the interior of the vehicle and 40 inches in the rear direction inside the vehicle.

Figure 4:
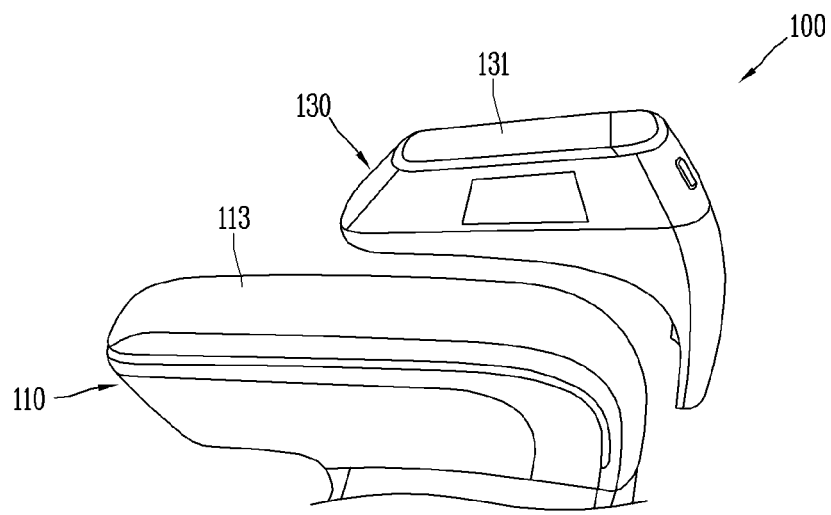
FIG. 4 is a partially exploded perspective view of a vehicle projector device according to the first embodiment of the present disclosure.
Figure 5:
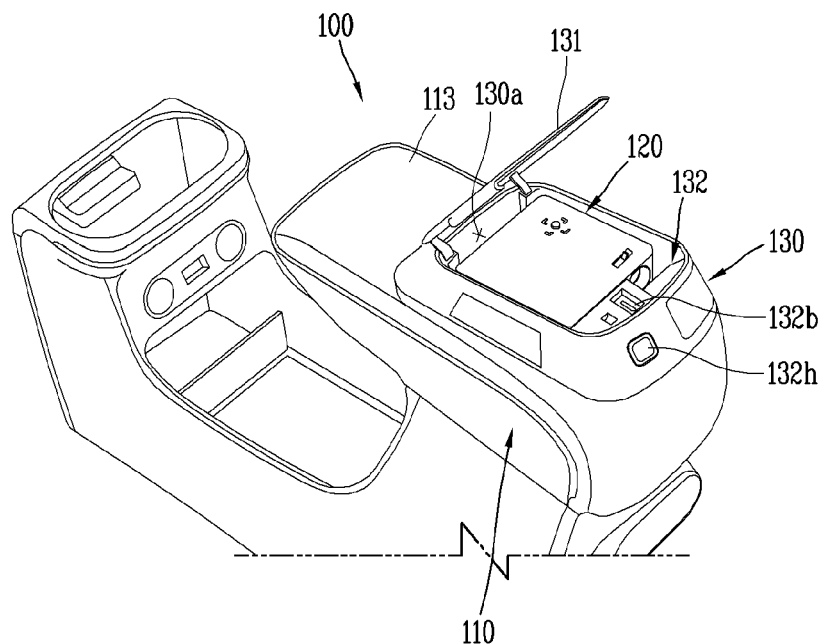
FIG. 5 is a perspective view illustrating the inside by opening a housing cover of a vehicle projector device according to the first embodiment of the present disclosure.
Figure 6:
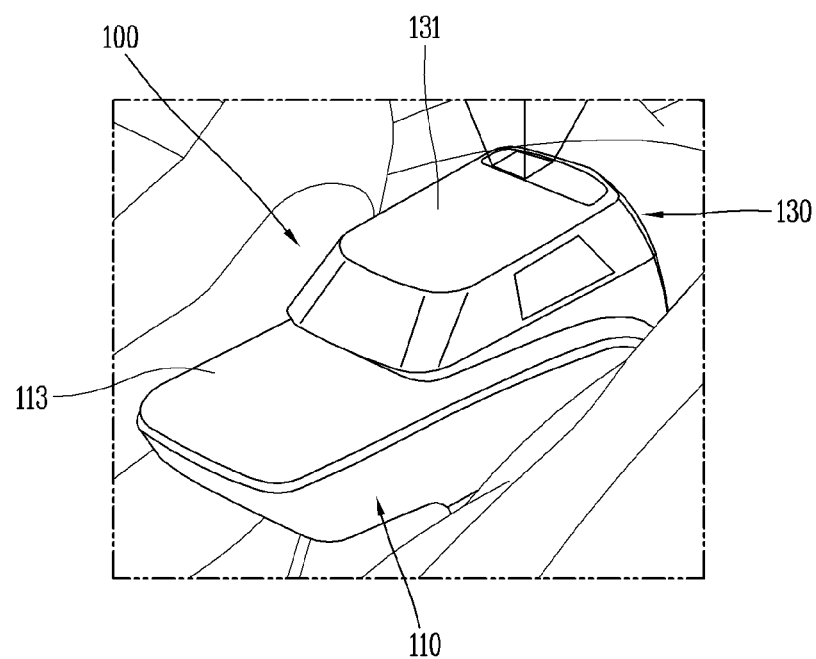
FIG. 6 is a perspective view illustrating a vehicle projector device according to the first embodiment of the present disclosure.

FIG. 4 is a partially exploded perspective view of a vehicle projector device 100 according to the first embodiment of the present disclosure, FIG. 5 is a perspective view illustrating the inside by opening a housing cover 131 of the vehicle projector device 100 according to the first embodiment of the present disclosure, and FIG. 6 is a perspective view illustrating the vehicle projector device 100 according to the first embodiment of the present disclosure.

Referring to FIGS. 4 to 6, the vehicle projector device 100 may further include a built-in housing 130.

The built-in housing 130 is installed on a top cover 113 and is configured to include a projector accommodating space 130a in which the projecting module 120 is installed.

The built-in housing 130 may include a housing cover 131. The housing cover 131 may be rotatably installed on one surface of the built-in housing 130.

Referring to FIG. 4, an example of the built-in housing 130 that is configured in an "L" shape as a whole and is installed on the right side of the armrest 110 is shown. The built-in housing 130 may be coupled to the top cover 113 of the armrest 110 by a bolt, for example, but is not necessarily limited to such a coupling structure.

In addition, although not clearly shown in the drawings, a power line for supplying power and a signal line for supplying a signal enabling automatic control may be electrically connected to the built-in housing 130.

In addition, referring to FIGS. 4 to 6, the housing cover 131 forms an upper surface of the built-in housing 130, and an example in which a projecting module 120 is installed in a projector accommodating space 130a of the built-in housing 130 by rotating the housing cover 131 is illustrated in FIG. 5.

In addition, FIG. 5 shows an example in which the housing cover 131 rotates with respect to the built-in housing 130 based on one point in the middle of the armrest 110 as a rotation center, but it is not necessarily limited to this structure, and an example in which the housing cover 131 may be installed to rotate based on another portion as a rotation center in consideration of a direction of image projection of the projecting module 120 may also be implemented.

Figure 7:
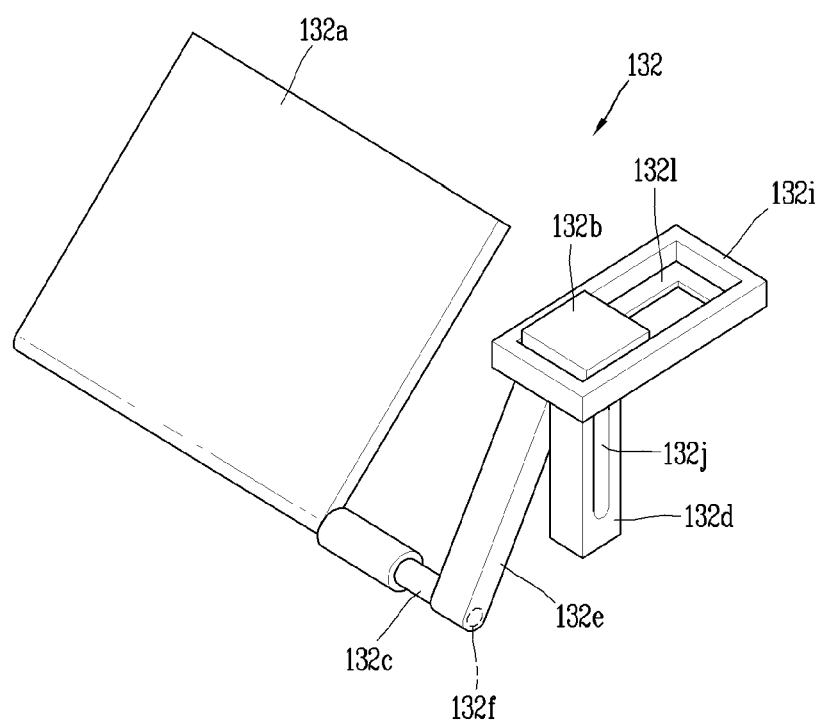
FIG. 7 is a perspective view illustrating a mirror disposed at an angle of a position by operating a button in a vehicle projector device according to the first embodiment of the present disclosure.
Figure 8:
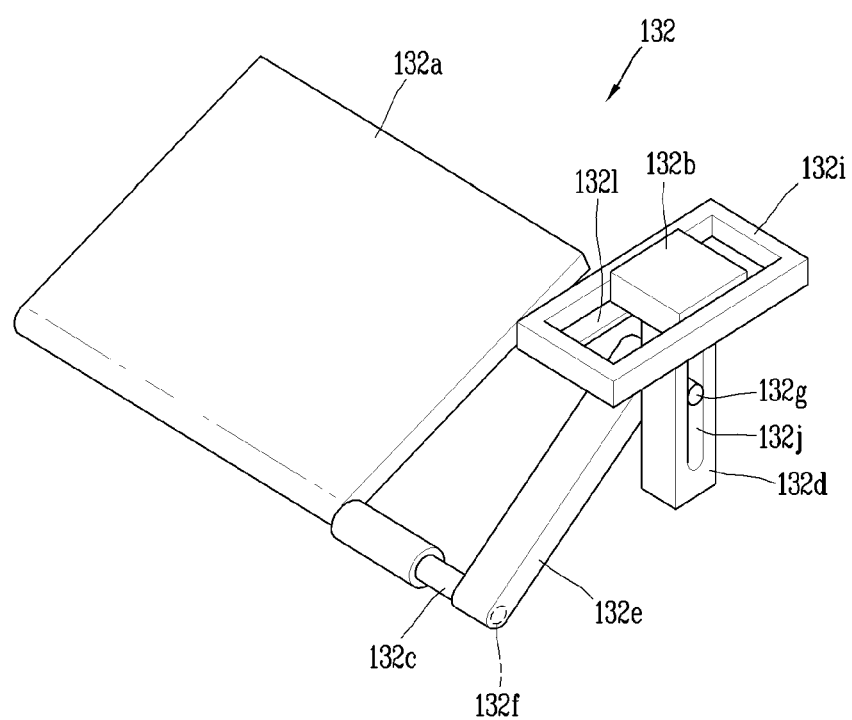
FIG. 8 is a perspective view illustrating a mirror disposed at another angle by operating a button in a vehicle projector device according to the first embodiment of the present disclosure.
Figure 9:
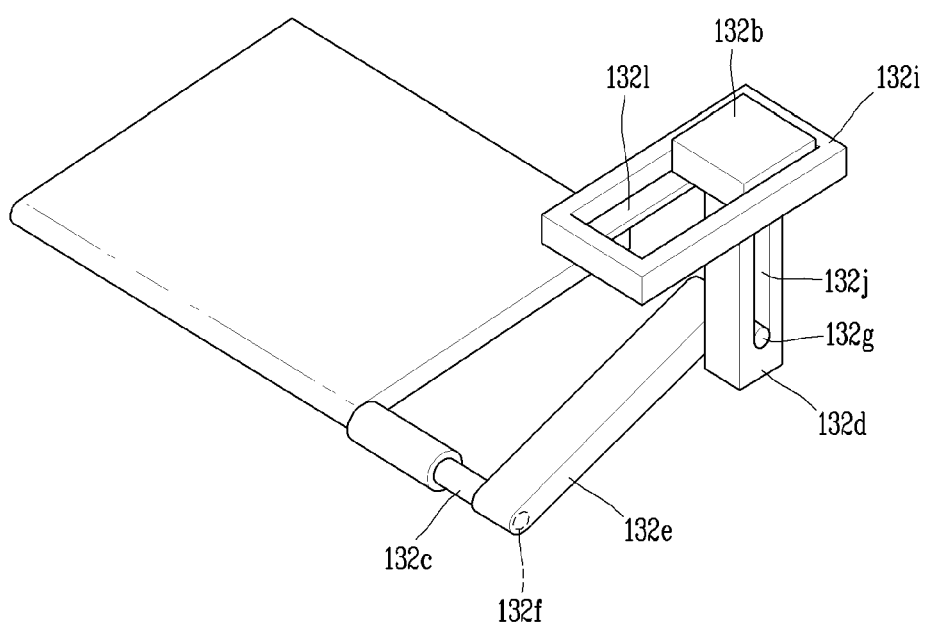
FIG. 9 is a perspective view illustrating a mirror disposed at an angle of another position by operating a button in a vehicle projector device according to the first embodiment of the present disclosure.

FIG. 7 is a perspective view illustrating a mirror disposed at an angle of a position by operating the button 132b in the vehicle projector device 100 according to the first embodiment of the present disclosure, FIG. 8 is a perspective view illustrating the mirror 132a disposed at another angle by operating the button 132b in the vehicle projector device 100 according to the first embodiment of the present disclosure, and FIG. 9 is a perspective view illustrating the mirror 132a disposed at an angle of another position by operating the button 132b in the vehicle projector device 100 according to the first embodiment of the present disclosure.

In addition, referring to FIGS. 5 and 7 to 9, the built-in housing 130 may further include a rotating mirror unit 132. The rotating mirror unit 132 includes the mirror 132a installed in the built-in housing 130 and reflecting an image projected from the projecting module 120 toward the ceiling or rear of the interior of the vehicle.

Figure 10:
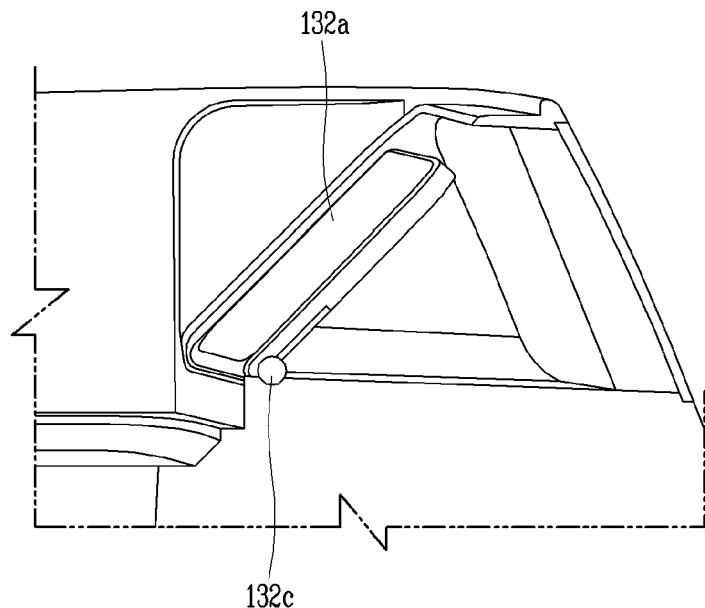
FIG. 10 is a perspective cross-sectional view illustrating a mirror and a rotating shaft in a vehicle projector device according to the first embodiment of the present disclosure.
Figure 11:
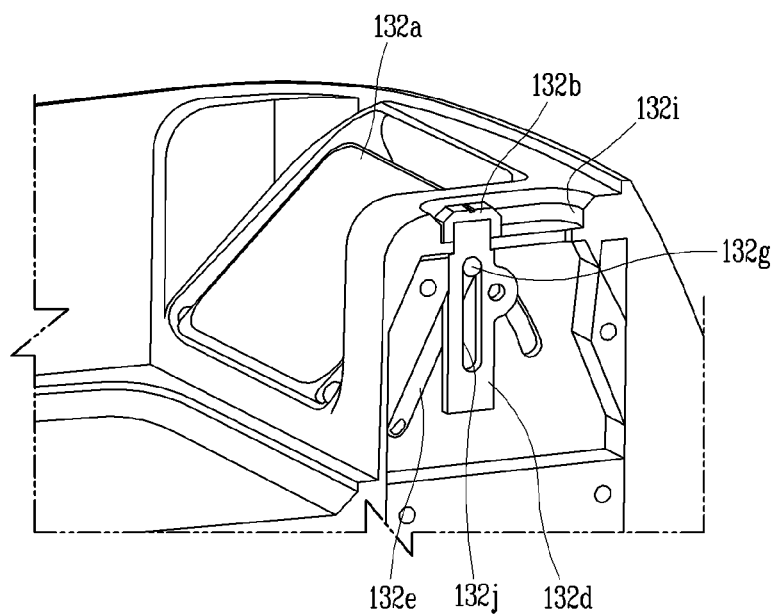
FIG. 11 is a perspective cross-sectional view illustrating a mirror, a guide groove, and a guide protrusion in a vehicle projector device according to the first embodiment of the present disclosure.
Figure 12:
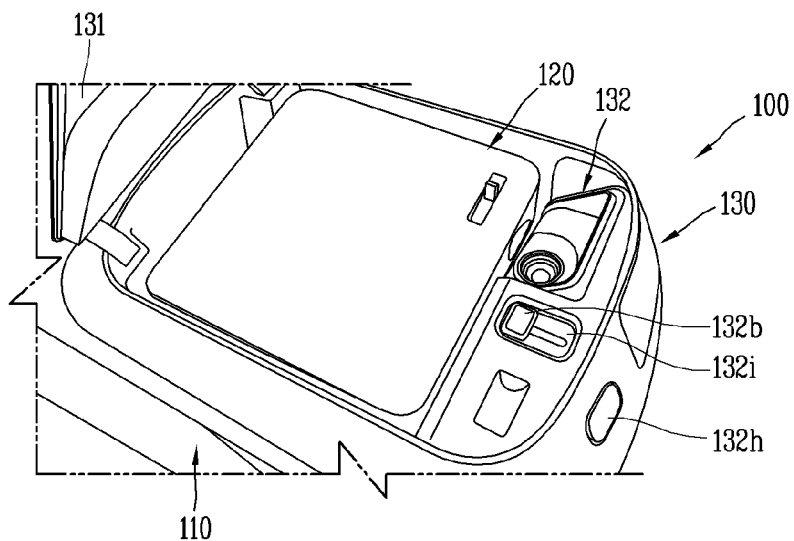
FIG. 12 is a perspective view illustrating an example in which a button is disposed at one position inside a vehicle projector device in which a housing cover is opened according to the first embodiment of the present disclosure.
Figure 13:
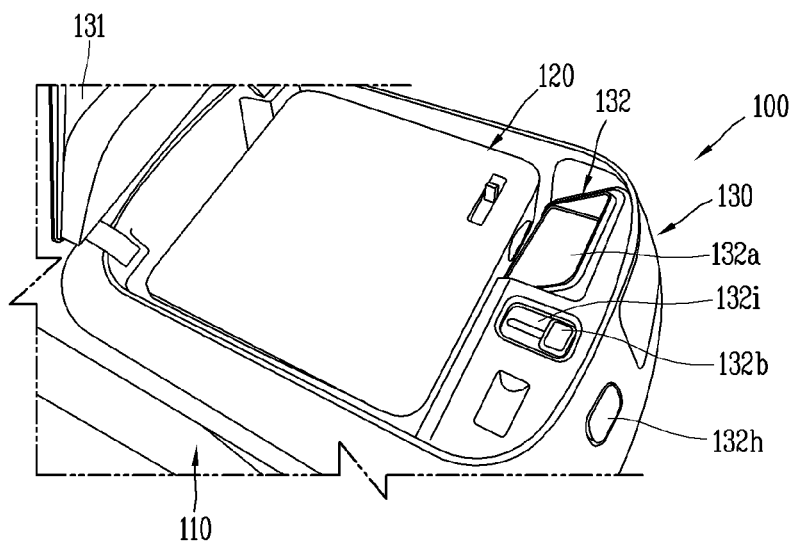
FIG. 13 is a perspective view illustrating an example in which a button is disposed at another position inside a vehicle projector device in which a housing cover is opened according to the first embodiment of the present disclosure.
Figure 14:
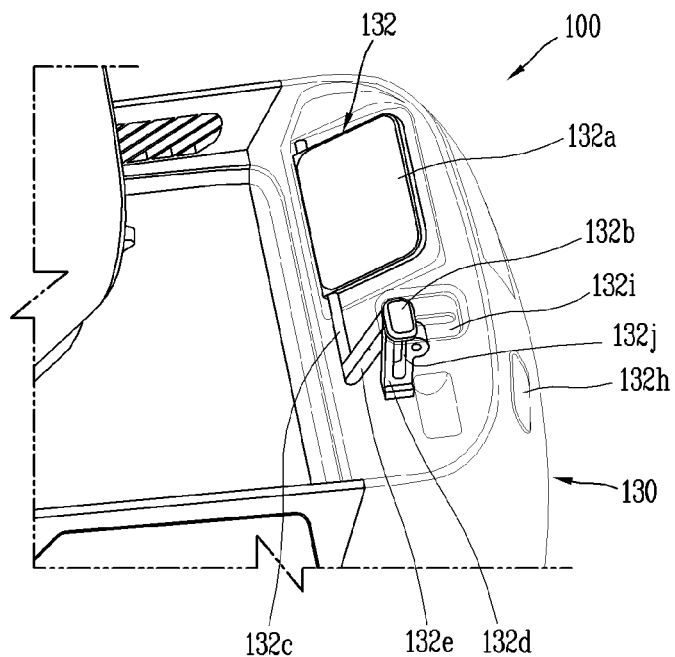
FIG. 14 is a perspective view illustrating a button and a mirror unit inside the vehicle projector device in which the housing cover is opened according to the first embodiment of the present disclosure.
Figure 15:
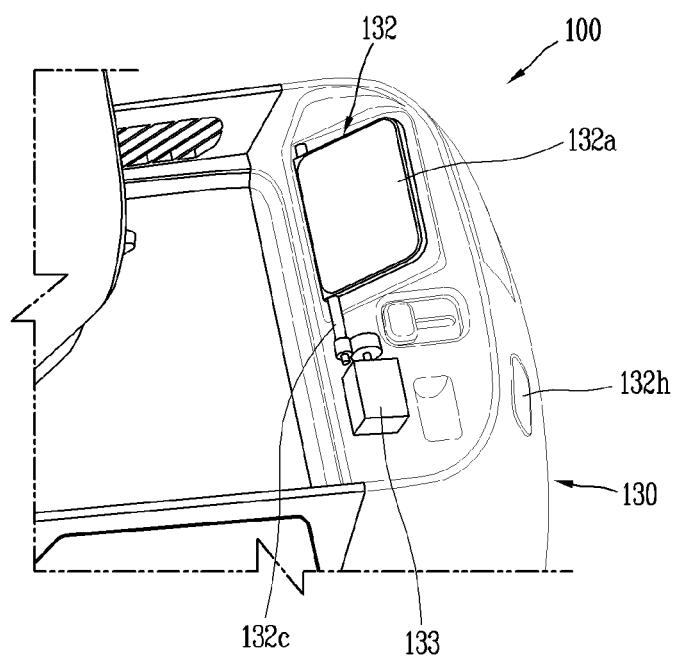
FIG. 15 is a perspective view illustrating an example in which a step motor is connected to a mirror unit inside the vehicle projector device in which the housing cover is opened according to the first embodiment of the present disclosure.
Figure 16:
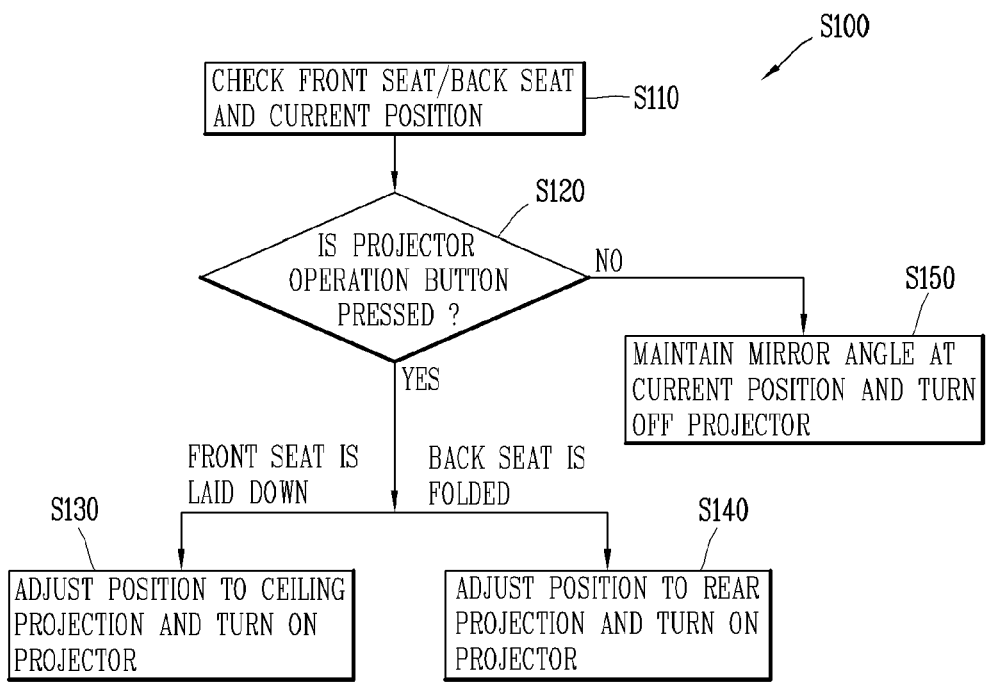
FIG. 16 is a flowchart illustrating a method of adjusting a position of a projection image of a projecting module using a vehicle projector device according to the first embodiment of the present disclosure.

FIG. 10 is a perspective cross-sectional view illustrating the mirror 132a and the rotating shaft 132c in the vehicle projector device 100 according to the first embodiment of the present disclosure, FIG. 11 is a perspective cross-sectional view illustrating the mirror 132a, a guide groove 132j, and a guide protrusion 132g in the vehicle projector device 100 according to the first embodiment of the present disclosure, FIG. 12 is a perspective view illustrating an example in which the button 132b is disposed at one position inside the vehicle projector device 100 in which the housing cover 131 is opened according to the first embodiment of the present disclosure, and FIG. 13 is a perspective view illustrating an example in which the button 132b is disposed at another position inside the vehicle projector device 100 in which the housing cover 131 is opened according to the first embodiment of the present disclosure.

Referring to FIGS. 5 and 10 to 13, a rotating mirror unit 132 having the mirror 132a inclined at a predetermined angle is shown inside the built-in housing 130. In addition, the mirror 132a is preferably disposed at a position where the mirror 132a may reflect the image projected from the projecting module 120 toward the ceiling or rear of the interior of the vehicle .

The rotating mirror unit 132 may include the button 132b.

The button 132b is connected to the mirror 132a to be linearly movable in one direction to enable a rotational movement of the mirror 132a.

FIGS. 7 to 9 show an example in which the button 132b is accommodated in a button movement guide 132i and is installed to be movable linearly by a predetermined distance from the lower left to the upper right direction.

In addition, the rotating mirror unit 132 may further include a rotating shaft 132c, a guide rail 132d, and a rotating link 132e.

The rotating shaft 132c may be connected to one side of the mirror 132a to form a rotation center during a rotational movement of the mirror 132a.

The guide rail 132d may include a guide groove 132j configured on one surface of the button 132b and configured in a direction intersecting one direction in which the button 132b linearly moves.

The rotating link 132e may be rotatably installed between the rotating shaft 132c and the guide groove 132j, and rotates by the linear movement of the button 132b to transmit rotational force to the rotating shaft 132c.

The rotating link 132e may include an accommodating hole 132f and the guide protrusion 132g.

The accommodating hole 132f may be configured on one side of the rotating link 132e to rotatably accommodate one side of the rotating shaft 132c.

The guide protrusion 132g may be configured to protrude from the other side of the rotating link 132e and installed in the guide groove 132j.

FIGS. 7 to 9 show an example in which the rotating shaft 132c forming a rotation center during rotation of the mirror 132a is connected to a lower side of the mirror 132a, and the rotating link 132e is rotatably installed on the rotating shaft 132c. The rotating link 132e is installed so that a lower side thereof is rotatable relative to the rotating shaft 132c and an upper side thereof is movably inserted into the guide groove 132j of the guide rail 132d and is movable along an extension direction of the guide rail 132d.

In addition, FIGS. 7 to 9 shows an example in which the accommodating hole 132f is configured on the lower side of the rotating link 132e so that the rotating shaft 132c is rotatably inserted therein and the protruding guide protrusion 132g is movably inserted in the guide groove 132j of the guide rail 132d on an upper side of the rotating link 132e.

In addition, a button movement guide 132i for guiding the button 132b to be linearly moved in one direction by a predetermined distance may be installed inside the built-in housing 130. The button movement guide 132i may have a rectangular frame-shaped structure having a jaw 132l therein for supporting the button in a downward direction, as shown in FIG. 7.

By this structure, the button 132b is guided by the button movement guide 132i to move in one direction, and the guide protrusion 132g of the rotating link 132e moves in a vertical direction in the guide groove 132j by the movement of the button 132b and the rotating link 132e rotates together with the rotating shaft 132c.

Accordingly, the mirror 132a is rotatable within a predetermined angle range so that a position of the image projected from the projecting module 120 may be adjusted. For example, the mirror 132a is rotatable between 0 degrees and 45 degrees.

Figure 17:
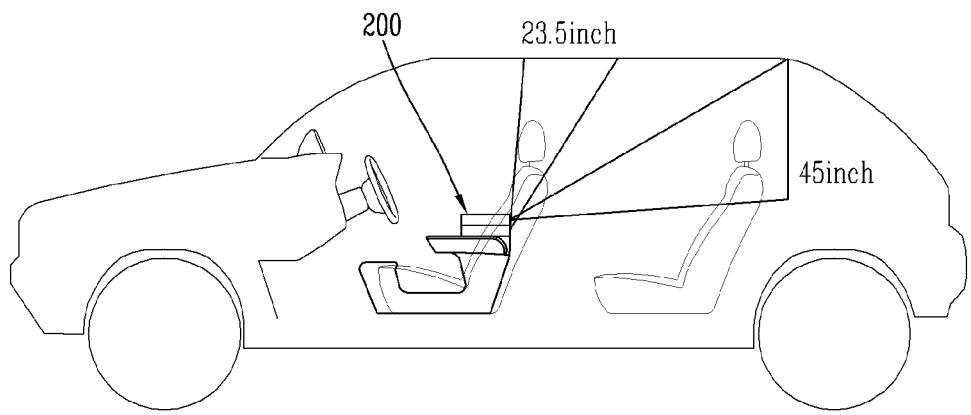
FIG. 17 is a side view schematically illustrating an example in which an image is projected inside a vehicle by using a vehicle projector device according to a second embodiment of the present disclosure.

Referring to FIG. 17, a method (S100) of adjusting a position of a projection image of the vehicle projector device 100 using the vehicle projector device 100 according to the first embodiment of the present disclosure will be described.

The method (S100) of adjusting a projection image position of the projecting module 120 includes checking a front seat, a back seat, and a current position (S110), pressing the button 132b of the projecting module 120 (S120), adjusting a projection position of an image of the projecting module 120 and turning on the projector to project the image toward the ceiling of the vehicle when the button 132b is pressed and the front seat is laid down (S130), and adjusting the projection position of the image of the projecting module 120 and turning on the projector to project the image to the rear of the interior of the vehicle when the button 132b is pressed and the back seat is folded (S140). In addition, if the button 132b is not pressed, the mirror 132a angle maintains the current position and the projecting module 120 is turned off (S150).

Hereinafter, a vehicle projector device 200 according to a second embodiment will be described with reference to FIGS. 17 to 24.

FIG. 17 is a side view schematically illustrating an example in which an image is projected inside a vehicle by the vehicle projector device 200 according to the second embodiment of the present disclosure.

FIG. 17 schematically shows an example in which an image is projected by the vehicle projector device 200 according to the second embodiment, and shows an example in which an image is projected by the projecting module 220 at a projection angle of 23.5 inches in the direction of the ceiling of the interior of the vehicle and a projection angle of 45 inches in the rear direction of the interior of the vehicle.

As described above, the vehicle projector device 200 of the present disclosure includes an armrest 210 and a projecting module 220.

The vehicle projector device 200 of the present disclosure is installed inside a vehicle.

The armrest 210 includes a top cover 213.

The projecting module 220 is rotatably installed on the armrest 210 to project an image toward the ceiling and rear of the interior of the vehicle, as shown in FIG. 17.

In the vehicle projector device 200 according to the second embodiment, the armrest 210 may further include a body 214.

The body 214 of the armrest 210 has a projector accommodating space 214a, and the projecting module 220 is installed in the projector accommodating space 214a.

In addition, at least a portion of the top cover 213 of the armrest 210 is rotated and opened by a user's manual operation.

In addition, the top cover 213 of the armrest 210 may include a first side cover 213a and a second side cover 213b.

The first side cover 213a is installed on the body 214 to form a portion of the top cover 213, and rotates about one side of the body 214.

The second side cover 213b is installed on the body 214 to form another portion of the top cover 213, and rotates about the other side of the body 214.

Figure 18:
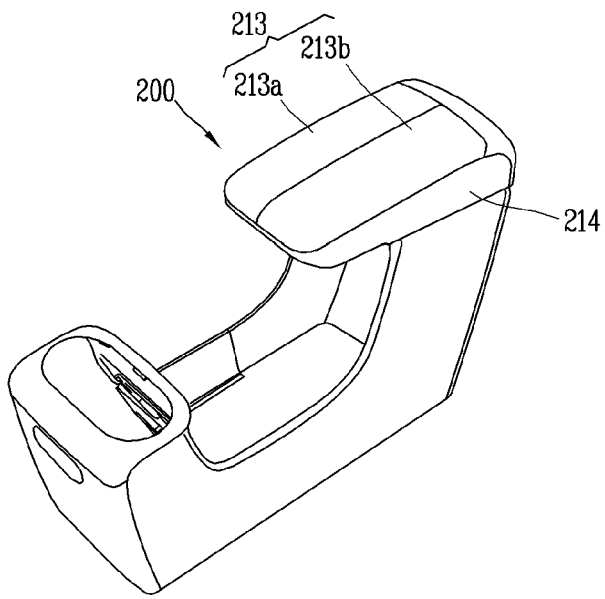
FIG. 18 is a perspective view illustrating a vehicle projector device according to the second embodiment of the present disclosure.
Figure 19:
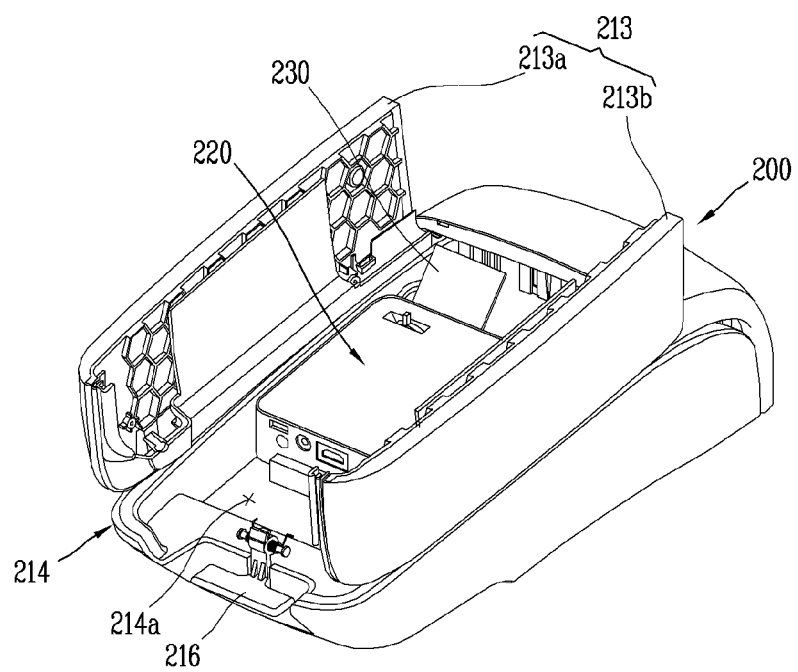
FIG. 19 is a perspective view illustrating an example in which a top cover is opened in FIG. 18.

FIG. 18 is a perspective view illustrating the vehicle projector device 200 according to the second embodiment of the present disclosure, and FIG. 19 is a perspective view illustrating an example in which the top cover 213 is opened in FIG. 18.

Referring to FIGS. 18 and 19, an example in which the top cover 213 provided at an upper portion of the armrest 210 is configured to include first and second side covers 213a and 213b is shown. The first an d second side covers 213a and 213b are provided to rotate based on both side ends of the body 214 as a rotation center.

More specifically, in FIG. 18, the first and second side covers 213a and 213b are closed to form the top cover 213 of the armrest 210, and in FIG. 19, an example in which the first and second side covers 213a and 213b rotate based on both side ends of the body 214 as a rotation center to open the body 214 of the armrest 210 is shown.

In addition, the armrest 210 may further include an opening button 216 that enables opening of the projector accommodating space 214a by rotating the first and second side covers 213a and 213b.

The opening button 216 presses the first and second side covers 213a and 213b to form the top cover 213 surface of the armrest 210. In addition, the opening button 216 enables opening of the projector accommodating space 214a by releasing the pressing and rotating the first and second side covers 213a and 213b by a user's manual operation.

FIG. 19 shows an example in which the opening button 216 is rotatably installed on the body 214, and the opening button 216 is preferably installed at a position convenient for the user to operate by hand.

In addition, the opening button 216 may be elastically connected to the body 214, and to this end, elastic components may be provided.

The opening button 216 presses one side of the first and second side covers 213a and 213b before being manually operated by the user, so that the first and second side covers 213a and 213b are not opened in a closed state. When manually operated by the user, the pressing of the first and second side covers 213a and 213b is released, and the first and second side covers 213a and 213b rotate to open the top cover 213 of the armrest 210.

The vehicle projector device 200 according to the second embodiment may further include an tilt mirror unit 230.

The tilt mirror unit 230 is installed on the body 214 and is inclined by a predetermined angle with respect to the projecting module 220 to change a path of the image projected by the projecting module 220 to the ceiling of the interior of the vehicle.

FIG. 19 shows an example in which the tilt mirror unit 230 is installed to be inclined by a predetermined angle so that the image projected from the projecting module 220 is reflected. The tilt mirror unit 230 is preferably configured at an angle to reflect the image projected from the projecting module 220 to the ceiling of the vehicle.

In addition, the vehicle projector device 200 according to the second embodiment may further include a lifting member 240.

The lifting member 240 may lift the projecting module 220 so as to adjust a relative distance between the projecting module 220 and the body 214 to project an image toward the rear of the vehicle.

Figure 20:
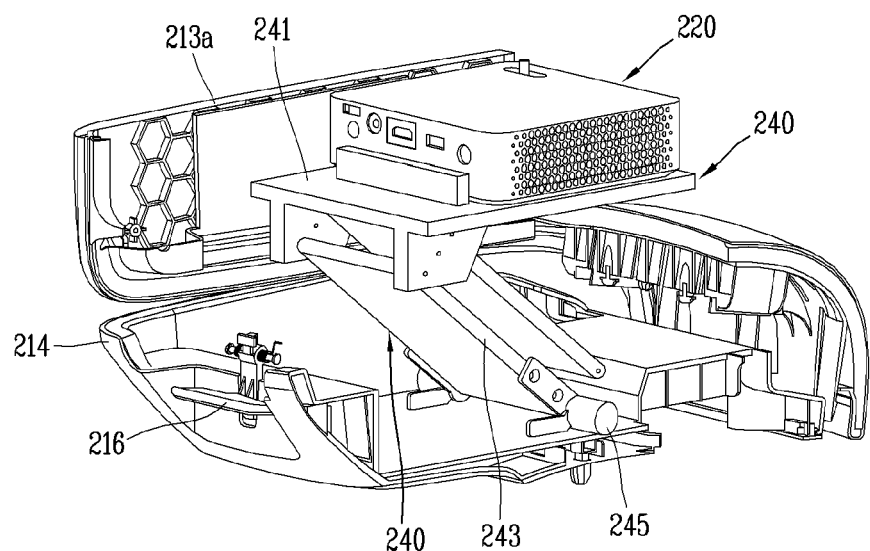
FIG. 20 is a cut-away perspective view illustrating an example in which a projecting module is moved upward by a lifting member in a vehicle projector device according to the second embodiment of the present disclosure.
Figure 21:
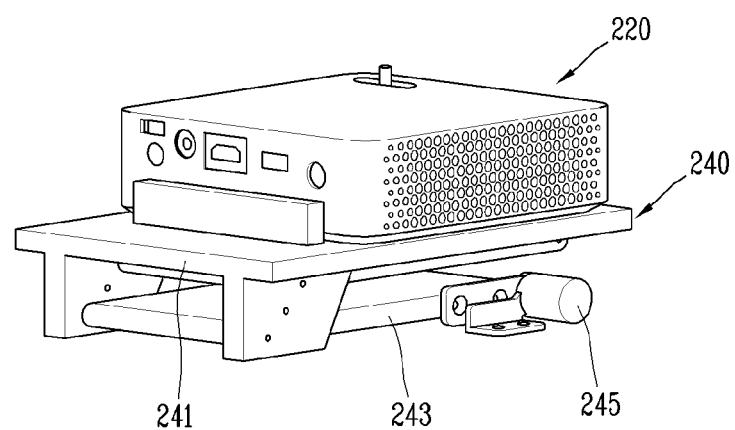
FIG. 21 is a perspective view illustrating an example in which a distance adjusting link is disposed at 0 degrees with respect to a bottom surface of a body in a vehicle projector device according to the second embodiment of the present disclosure.
Figure 22:
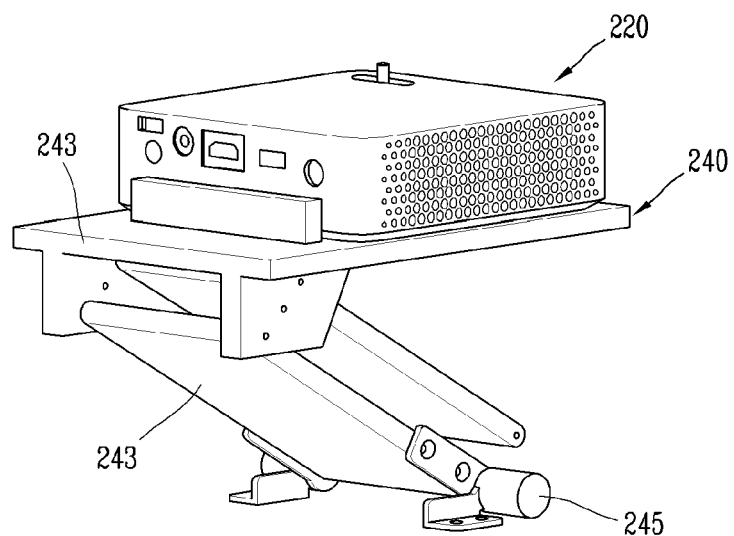
FIG. 22 is a perspective view illustrating an example in which a distance adjusting link is disposed at 45 degrees with respect to a bottom surface of a body in a vehicle projector device according to the second embodiment of the present disclosure.
Figure 23:
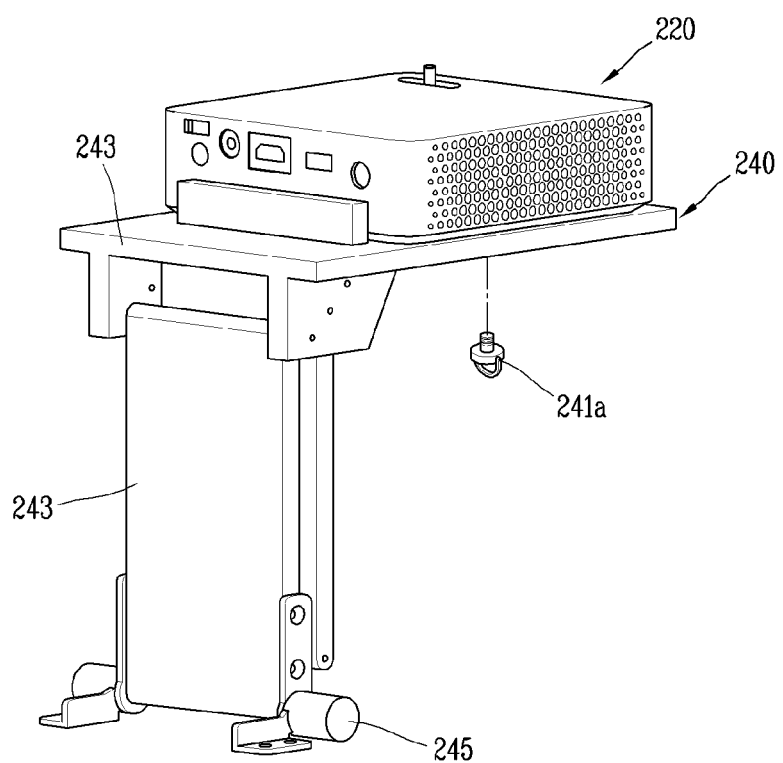
FIG. 23 is a perspective view illustrating an example in which a distance adjusting link is disposed at 90 degrees with respect to a bottom surface a body in a vehicle projector device according to the second embodiment of the present disclosure.

FIG. 20 is a cut-away perspective view illustrating an example in which the projecting module 220 is moved upward by the lifting member 240 in the vehicle projector device 200 according to the second embodiment of the present disclosure, FIG. 21 is a perspective view illustrating an example in which a distance adjusting link 243 is disposed at 0 degrees with respect to a bottom surface of the body 214 in the vehicle projector device 200 according to the second embodiment of the present disclosure, FIG. 22 is a perspective view illustrating an example in which the distance adjusting link 243 is disposed at 45 degrees with respect to the bottom surface of the body 214 in the vehicle projector device 200 according to the second embodiment of the present disclosure, and FIG. 23 is a perspective view illustrating an example in which the distance adjusting link 243 is disposed at 90 degrees with respect to the bottom surface the body 214 in the vehicle projector device 200 according to the second embodiment of the present disclosure.

Referring to FIGS. 20 to 23, the lifting member 240 enables the projecting module 220 to be lifted and lowered by adjusting a relative distance between the projecting module 220 and the body 214.

By the lifting member 240, a position of the projecting module 220 may be adjusted in a vertical direction, and the position of the image projected to the rear of the vehicle may be adjusted in the vertical direction.

As an example, the lifting member 240 may include a bracket 241 and a distance adjusting link 243.

The bracket 241 may be installed on at least one surface of the projecting module 220 to support the projecting module 220.

For example, the projecting module 220 and the bracket 241 may be fastened to each other by screw coupling by the screw 241a, but is not necessarily limited to the coupling structure.

The distance adjusting link 243 is rotatably installed between the bracket 241 and the body 214 to adjust the relative distance between the bracket 241 and the body 214.

Referring to FIGS. 20 to 23, the bracket 241 supports the projecting module 220 from a lower surface of the projecting module 220. A relative distance of the bracket 241 with respect to the body 214 is adjusted in the vertical direction by rotation of the distance adjusting link 243.

In addition, an example in which one side of the distance adjusting link 243 is rotatably installed on the bracket 241 and the other side is rotatably installed on the body 214 is shown in FIGS. 21 to 24.

The lifting member 240 may further include a step motor 245, the step motor 245 is installed between the body 214 and the distance adjusting link 243 to enable adjustment of a rotation angle of the distance adjusting link 243.

An example in which two step motors 245 are installed at both ends of the distance adjusting link 243 between the other side of the distance adjusting link 243 and the body 214 is shown in FIG. 21.

Examples in which the angle between the distance adjusting link 243 and the upper surface of the body 214 are respectively adjusted to 0 degrees, about 45 degrees, and 90 degrees by the step motor 245 are shown in FIGS. 21 to 23, respectively.

Figure 24:
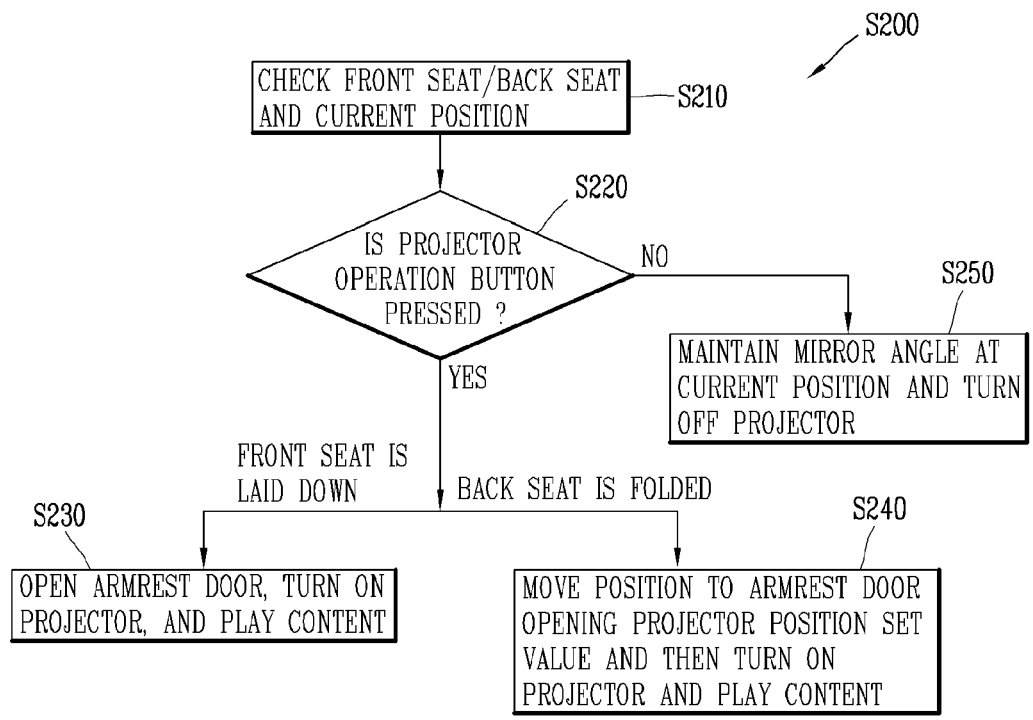
FIG. 24 is a flowchart illustrating a method of adjusting a projection image position of a projecting module using a vehicle projector device according to the second embodiment of the present disclosure.

FIG. 24 is a flowchart illustrating a method (S200) of adjusting a position of a projection image of a projecting module using the vehicle projector device 200 according to the second embodiment of the present disclosure.

Referring to FIG. 24, the method (S200) of adjusting a position of a projection image of the projecting module using the vehicle projector device 200 according to the second embodiment of the present disclosure will be described.

The method (S200) of adjusting a position of a projection image of the projector module 220 includes checking a front seat, a back seat, and a current position (S210), pressing a button of the projecting module 220 (S220), opening the top cover 213 of the armrest 210 and turning on a projector when the button is pressed and the front seat is laid down (S230), and moving a position to a set value of a projection position of an image of the projecting module 220 and then turning on the projector when the button is pressed and the back seat is folded (S240). In addition, if the button is not pressed, the mirror angle maintains the current position and the projecting module 220 is turned off (S250).

Hereinafter, the vehicle projector device 300 according to a third embodiment will be described with reference to FIGS. 25 to 35.

Figure 25:
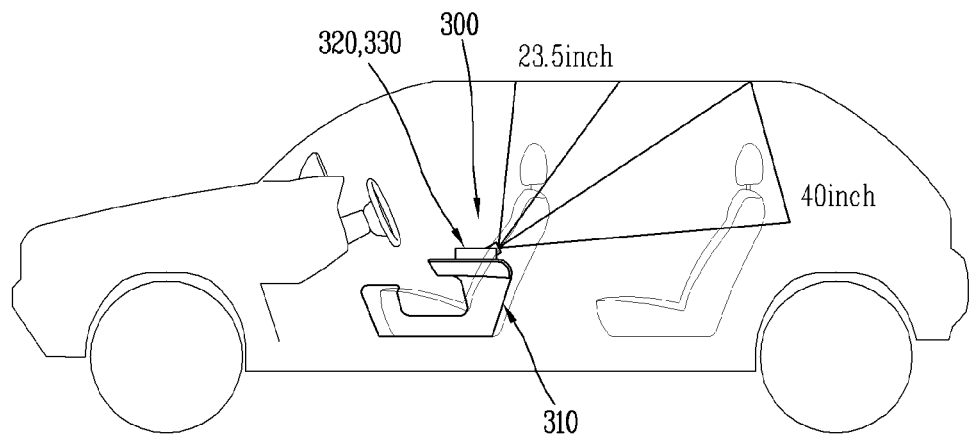
FIG. 25 is a side view schematically illustrating an example in which an image is projected inside a vehicle by a vehicle projector device according to a third embodiment of the present disclosure.

FIG. 25 is a side view schematically illustrating an example in which an image is projected in the interior of a vehicle by the vehicle projector device 300 according to the third embodiment of the present disclosure.

In addition, FIG. 25 schematically shows an example in which an image is projected by the vehicle projector device 300 according to the third embodiment, and shows an example in which an image is projected by the projecting module 220 at a projection angle of 23.5 inches in the direction of the ceiling of the interior of the vehicle and a projection angle of 40 inches in the rear direction of the interior of the vehicle.

As described above, the vehicle projector device 300 of the present disclosure includes an armrest 310 and a projecting module 320.

Figure 26:
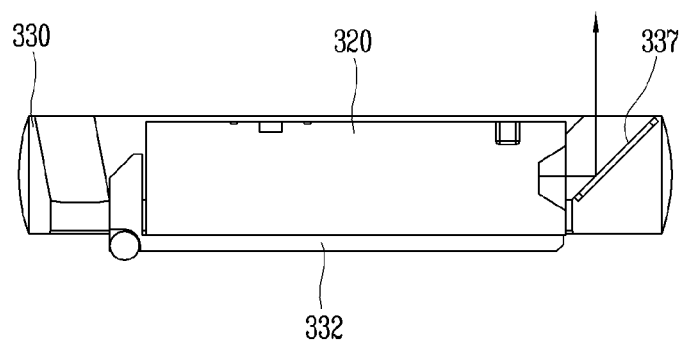
FIG. 26 is a side view schematically illustrating an example in which an image is projected to a ceiling of the interior of a vehicle by a vehicle projector device according to the third embodiment of the present disclosure.
Figure 27:
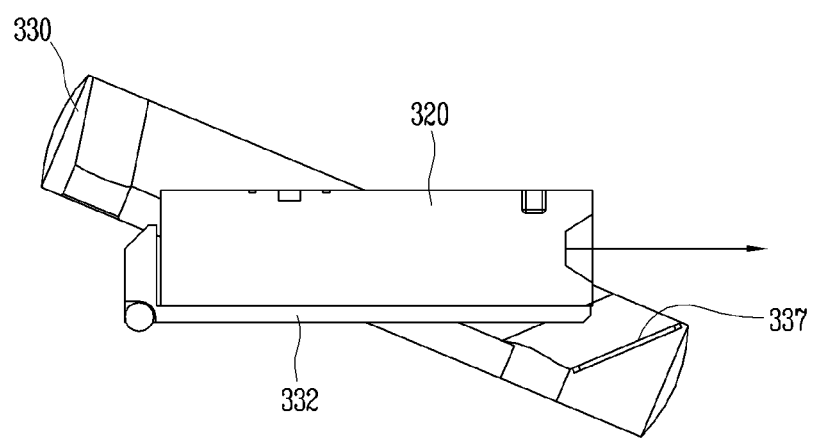
FIG. 27 is a side view schematically illustrating an example in which an image is projected to the rear of the interior of a vehicle by a vehicle projector device according to the third embodiment of the present disclosure.

FIG. 26 is a side view schematically illustrating an example in which an image is projected onto a ceiling of the interior of a vehicle by the vehicle projector device 300 according to the third embodiment of the present disclosure, and FIG. 27 is a side view schematically illustrating an example in which an image is projected to the rear of the interior of a vehicle by the projector device 300.

As shown in FIGS. 26 and 27, the vehicle projector device 300 according to the third embodiment may project the projecting module 320 upward to the ceiling of the interior of the vehicle, and the projecting module 320 may be rotated by a rotating support 330 and project backward in the interior of the vehicle in the rotated state.

Also, the vehicle projector device 300 according to the third embodiment may be understood as a structure that may be carried by a user.

The vehicle projector device 300 according to the third embodiment of the present disclosure further includes the rotating support 330.

Figure 28:
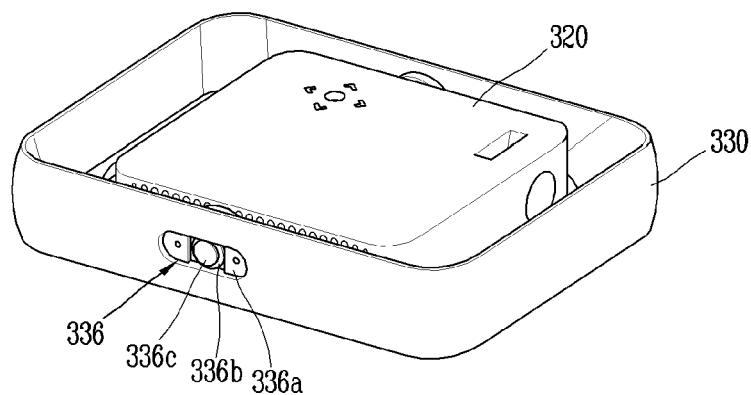
FIG. 28 is a perspective view illustrating an example of a rotating support in a vehicle projector device according to the third embodiment of the present disclosure.
Figure 29:
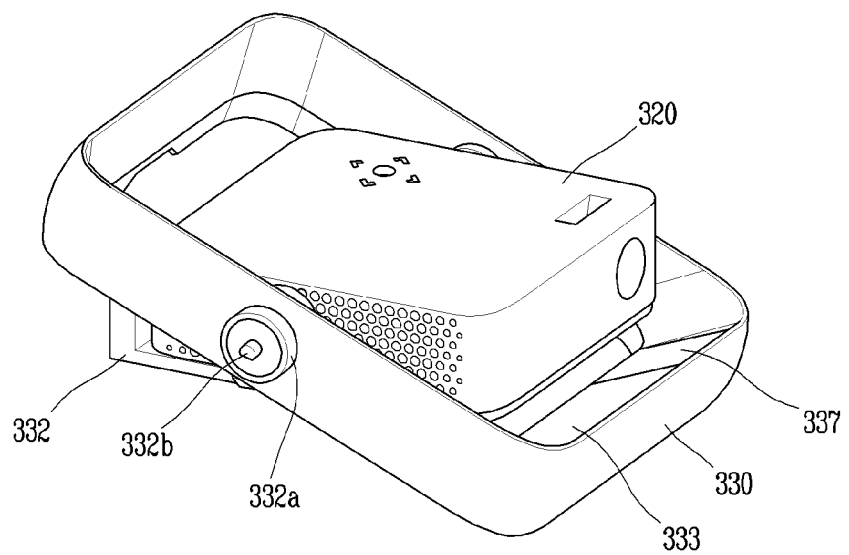
FIG. 29 is a perspective view illustrating another example of a rotating support in a vehicle projector device according to the third embodiment of the present disclosure.
Figure 30:
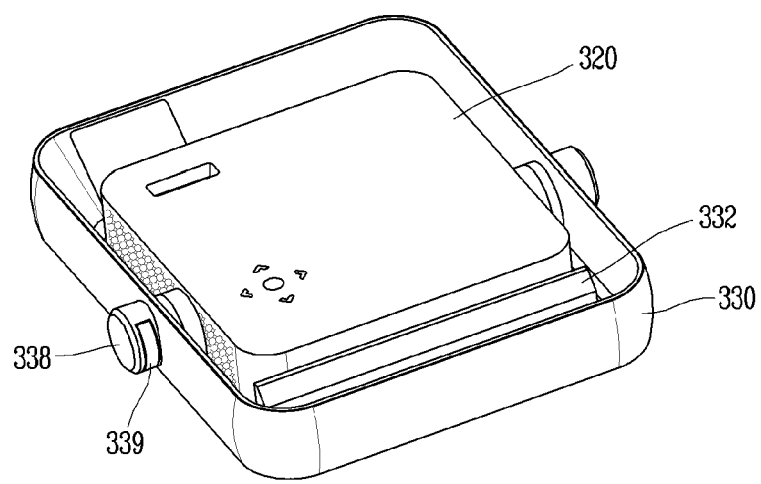
FIG. 30 is a perspective view illustrating an example in which a power outlet is installed in FIG. 29.

FIG. 28 is a perspective view illustrating an example of the rotating support 330 in the vehicle projector device 300 according to the third embodiment of the present disclosure, and FIG. 29 is a perspective view illustrating an example of the rotating support 330, and FIG. 30 is a perspective view illustrating a bottom surface of another example in the vehicle projector device 300 according to the third embodiment of the present disclosure.

The rotating support 330 may rotatably support the projecting module 320, and may be disposed at a position inside the vehicle on the top cover 313. For example, the rotating support 330 may be disposed on an upper surface of the top cover 313.

The rotating support 330 may also serve as a handle when moving the vehicle projector device 300 of the third embodiment, and may be carried by the user by the rotating support 330.

First, the rotating support 330 of an example is described.

A rotating bracket 332 may be installed on an inner periphery of the rotating support 330, which rotates in one direction crossing the inner periphery of the rotating support 330 as a rotation axis and supports the projecting module 320.

FIG. 28 shows an exemplary rotating support 330, which includes a free stop hinge 336 to support the projecting module 320. The free stop hinge 336 is operable to manually rotate the projecting module 320.

In addition, referring to FIG. 28, the free stop hinge 336 may include, for example, a seating plate 336*a* mounted on the rotating support 330, a washer 336*b* disposed on the seating plate 336*a*, and a bolt 336*c* installed on a side portion of the projecting module 320 to couple the rotating support 330.

The projecting module 320 is rotatably coupled to the rotating support 330 by the free stop hinge 336 to provide various projection angles to the rear of the vehicle interior.

Hereinafter, the rotating support 330 of another example is described with reference to FIG. 29.

On an inner periphery of the rotating support 330 of FIG. 29, a rotating bracket 332 rotating in one direction crossing the inner periphery of the rotating support 330, as a rotation axis, and supporting the projecting module 320 may be installed.

In addition, rotating support bosses 332*a* that are rotatably installed in a rotating support cylindrical portion and form a rotation center are provided on both sides of the rotating bracket 332, and a rotation hole 330*a* for rotatably accommodating the rotating support boss 332*a* may be provided on both sides of the rotating support 330.

Referring to FIG. 29, rotating support bosses 332*a* forming a rotation center are provided on both sides of the rotating bracket 332, and on both sides of the rotating support 330, the rotating support bosses 332*a* is provided. the rotation hole 330*a* for rotatably accommodating the rotating support bosses 332*a* may be provided on both sides of the rotating support 330.

The rotating support 330 is configured to accommodate the projecting module 320. For example, the rotating support 330 may be configured to have a rectangular shape.

The rotating support 330 may be provided with a rotating bracket 332 that is in contact with the bottom surface and the side surface of the projecting module 320 to support the projecting module 320. Rotating support bosses 332*a* are provided on both sides of the rotating bracket 332, and the rotating support bosses 332*a* are rotatably inserted and installed in the rotation holes 330*a* on both sides of the rotating support 330.

FIGS. 26 to 29 show an example of a rotating bracket 332 supporting the projecting module 320 so as to be in contact with the bottom surface and the side surface of the projecting module 320 is shown, and preferably, the rotating bracket 332 firmly supports the projecting module 320 not to be separated to the outside when the projecting module 320 is rotated with respect to the rotating support 330.

Also, referring to FIG. 29, a step motor 332*b* providing various angles for projection to the rear side by rotating the rotating bracket 332 may be installed on the inner periphery of the rotating support boss 332*a*.

On one surface of the inner periphery of the rotating support 330 adjacent to the projecting module 320 on which the image is projected, one side of the inner periphery of the rotating support 330 may have an inclined portion 333 inclined at a predetermined angle so that an image of the projecting module 320 is projected to the ceiling of the interior of the vehicle.

A mirror unit 337 is installed on the inclined portion 333 so that the image of the projecting module 320 is reflected to the ceiling of the interior of the vehicle.

As described above, since the inclined portion 333 is configured to be inclined by a predetermined angle with respect to the projecting module 320 on one surface of the inner periphery of the rotating support 330, the mirror unit 337 is also inclined at a predetermined angle with respect to the projecting module 320, and the image projected from the projecting module 320 is reflected from the mirror unit 337 and projected onto the ceiling of the interior of the vehicle.

Figure 31:
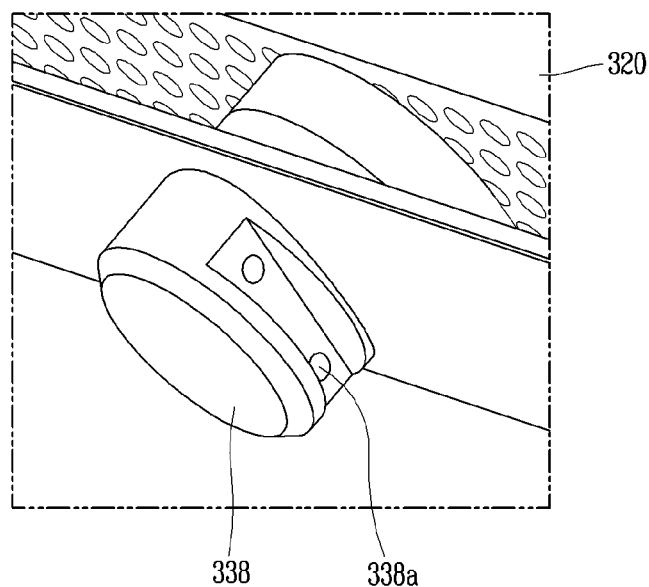
FIG. 31 is an enlarged perspective view of a power outlet accommodating a power plug of FIG. 30.
Figure 32:
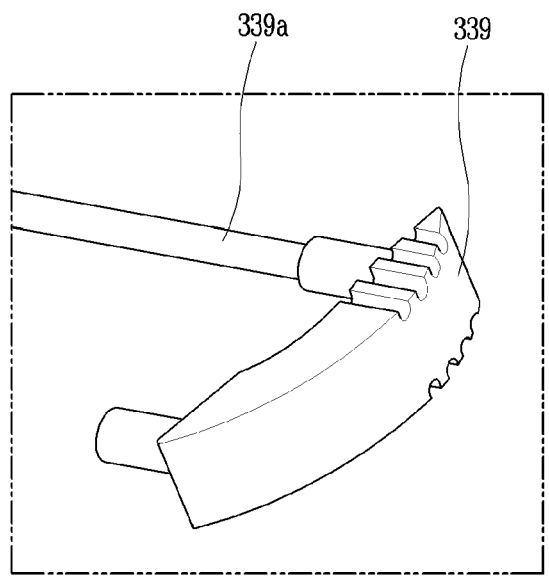
FIG. 32 is a perspective view illustrating the power plug of FIG. 30.

In FIG. 30, a power outlet 338 of an example in FIG. 29 is installed, and FIG. 31 shows the power outlet 338 accommodating a power plug 339 and FIG. 32 shows an enlarged power plug 339 of FIG. 30.

Figure 33:
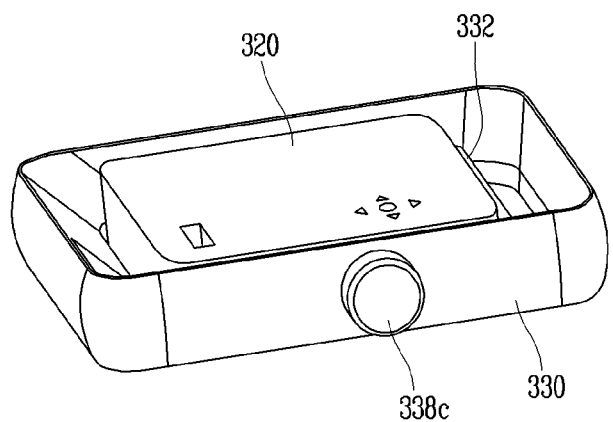
FIG. 33 is a perspective view illustrating an example in which a rotary stopper is installed in a power plug accommodating portion of another example in FIGS. 29 and 30.
Figure 34:
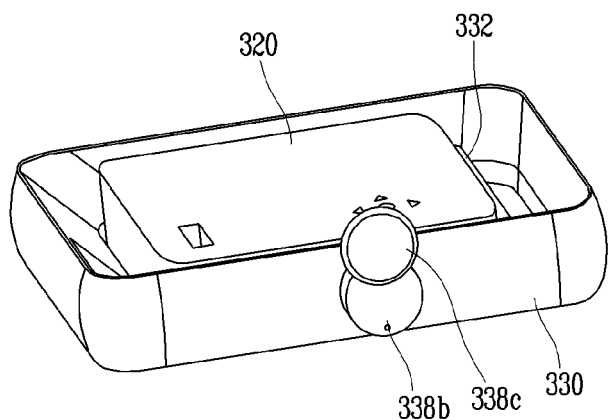
FIG. 34 is a perspective view illustrating an example in which a rotary stopper is rotated in a power outlet of another example in FIG. 33.

In addition, referring to FIG. 33, a rotary stopper 338*c* is installed in the power outlet 338 accommodating the power plug 339 of another example in FIGS. 29 and 30, and in FIG. 34, the power outlet 338 includes a power hole 338*b* on which the rotary stopper 338*c* is rotated, and a plug may be inserted into the power hole 338*b* to supply power.

Figure 35:
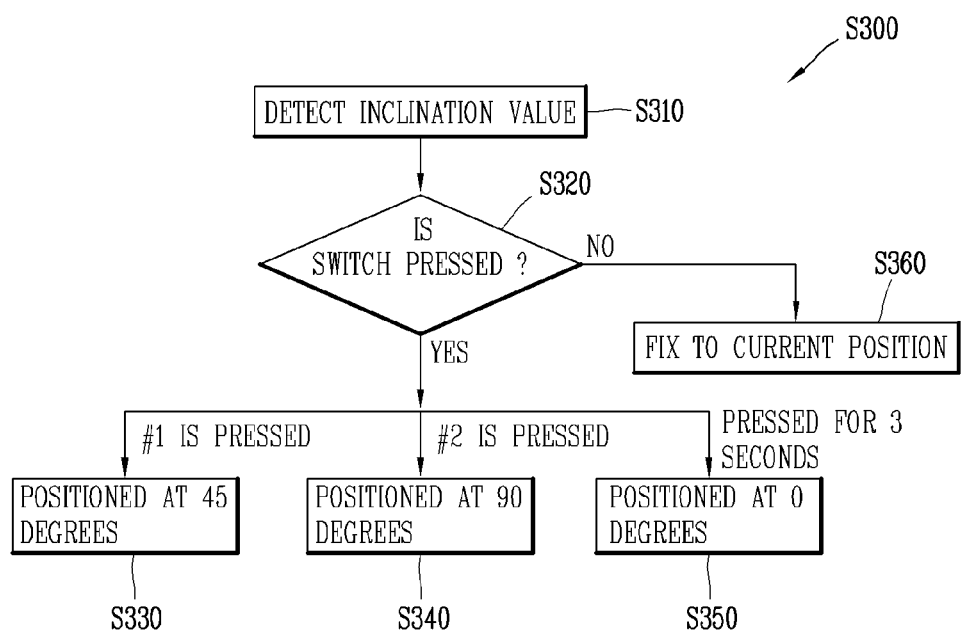
FIG. 35 is a flowchart illustrating a method of adjusting a position of a projection image of a projecting module using a vehicle projector device according to the third embodiment of the present disclosure.

Meanwhile, FIG. 35 is a flowchart illustrating a method (S300) of adjusting a position of a projection image of the projecting module 320 using the vehicle projector device 300 according to the third embodiment of the present disclosure.

With reference to FIG. 35, the method (S300) of adjusting a position of a projection image of the projecting module 320 using the vehicle projector device 300 according to the third embodiment of the present disclosure will be described.

The method (S300) of adjusting a position of a projection image of the projecting module 320 includes detecting an inclination value (S310), pressing a switch (not shown) of the projecting module 320 (S320), pressing the switch once so that a relative angle between the rotating support 330 and the projecting module 320 is positioned at 45 degrees according to a switch signal (S330), pressing the switch twice so that a relative angle between the rotating support 330 and the projecting module 320 is positioned at 90 degrees according to a switch signal (S340), pressing the switch for three seconds so that a relative angle between the rotating support 330 and the projecting module 320 is positioned at 0 degrees according to a switch signal (S350), and fixing the mirror angle to the current position and turning off the projecting module 320 when the switch is not pressed (S360).

Meanwhile, in the vehicle projecting module 320 device of the present disclosure, an output position of the image may be automatically adjusted.

The feature of automatically adjusting the projecting module 320 device is output toward the ceiling of the interior of the vehicle or the rear of the interior of the vehicle based on a position of a vehicle seat.

In addition, based on whether or not the screen is lowered to the rear, if the screen is lowered to the rear, the projecting module 320 is output to the rear of the vehicle interior.

In addition, an output direction may be determined by automatically searching for the passenger's gaze direction or an area not covered by the passenger.

To this end, the vehicle projector device 100, 200, or 300 of the present disclosure may include a vehicle controller 160, 260, or 360, an interface unit 170, 270, or 370 and a projector controller 180, 280, or 380.

The vehicle controller 160, 260, or 360 is configured to obtain vehicle-related information. For example, the vehicle controller 160, 260, or 360 may be an electronic control unit (ECU) or a controller. Also, the vehicle controller 160, 260, or 360 may be understood as a first controller.

The vehicle-related information obtained by the vehicle controller 160, 260, or 360 includes seat position information, screen position information for irradiating light to the rear of the vehicle, and passenger-related information. Based on the vehicle-related information, an output direction of the projecting module is determined.

The seat position information is information on an angle of at least one or more seats, and may be an inclined degree of a seat back.

The screen position information may be whether a screen is hung inside the vehicle or an operation state of a screen driving unit that drives the screen.

The passenger-related information includes information on a direction of at least one or more passengers or information on a result of searching for an area not covered by a passenger in the vehicle or an external object. The passenger-related information may be obtained from at least one or more sensors disposed in the vehicle.

The interface unit 170, 270, or 370 are configured to receive the acquired vehicle-related information.

The interface unit 170, 270, or 370 may exchange signals with at least one electronic device provided in the vehicle by wire or wirelessly. For example, the interface unit 170, 270, or 370 may exchange signals with the vehicle controller 160, 260, or 360 and the projector controller 180, 280, or 380 by wire or wirelessly. The interface unit 170, 270, or 370 may be configured as at least one of a communication module, a terminal, a pin, a cable, a port, a circuit, an element, and a device.

The projector controller 180, 280, or 380 obtains vehicle-related information from the interface unit 170, 270, or 370 and determine an output direction of the projecting module 320 based on the vehicle-related information, and a motor unit is driven so that the mirror unit may be rotated in response to the output direction of the determined projecting module 320.

Figure 36:
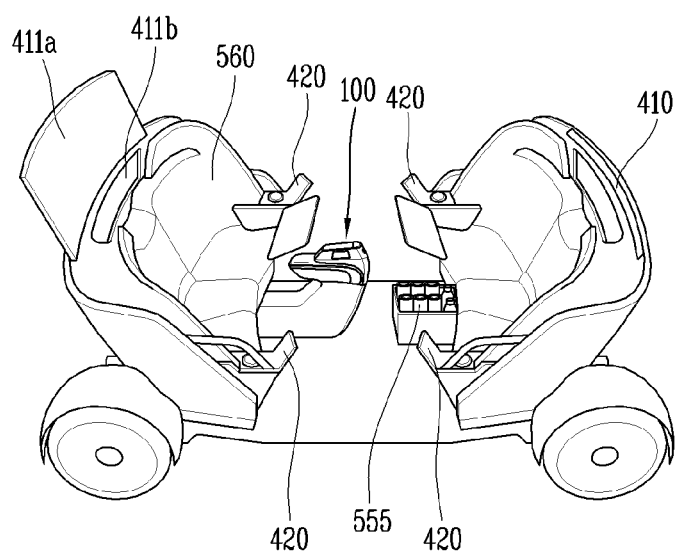
FIG. 36 is a perspective view illustrating an example of a vehicle cabin system of the present disclosure.
Figure 37:
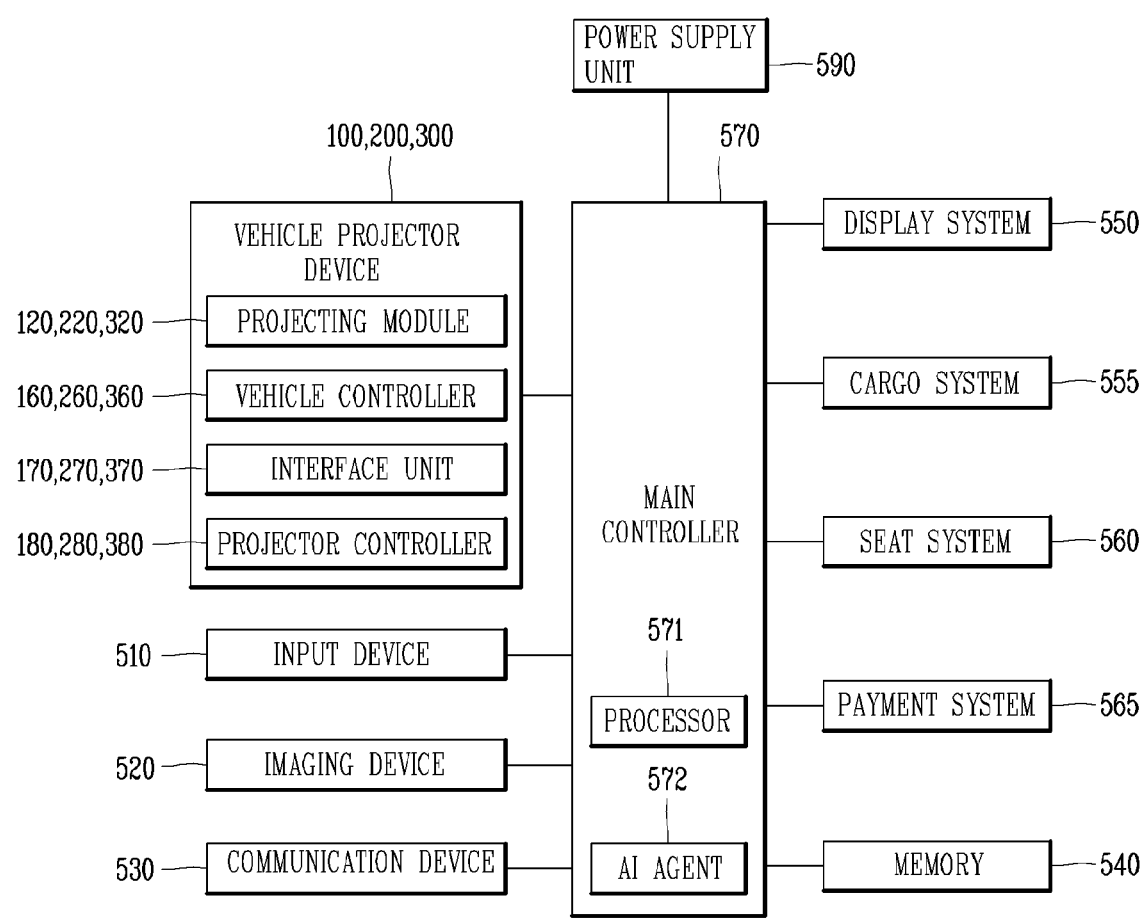
FIG. 37 is a block diagram showing an example of a vehicle cabin system of the present disclosure.

FIG. 36 is a perspective view illustrating an example of a vehicle cabin system 400 of the present disclosure, and FIG. 37 is a block diagram showing an example of the vehicle cabin system 400 of the present disclosure.

The vehicle cabin system 400 of the present disclosure includes a plurality of seats 560 to which the aforementioned vehicle projector device 100 is connected.

The vehicle cabin system 400 (hereinafter, referred to as a cabin system) of the present disclosure may be defined as a convenience system for a user using a vehicle.

The cabin system 400 may be described as a top-level system including a display system 550, a cargo system 555, a seat system 560, and a payment system 565. The cabin system 400 may include a main controller 570, a memory 540, an interface unit 170, 270, or 370, a power supply unit 590, an input device 510, an imaging device 520, a communication device 530, the display system 550, the cargo system 555, the seat system 560, and the payment system 565.

Depending on an embodiment, the cabin system 400 may further include components other than the components described herein, or may not include some of the components described herein.

The main controller 570 may be electrically connected to the input device 510, the communication device 530, the display system 550, the cargo system 555, the seat system 560, and the payment system 565 to exchange signals. The main controller 570 may control the input device 510, the communication device 530, the display system 550, the cargo system 555, the seat system 560, and the payment system 565. The main controller 570 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electrical units for performing functions.

The main controller 570 may include at least one sub-controller. According to an embodiment, the main controller 570 may include a plurality of sub-controllers.

Each of the sub-controllers may individually control devices and systems included in the grouped cabin system 400. Devices and systems included in the cabin system 400 may be grouped by function or grouped based on a seatable seat.

The main controller 570 may include at least one processor 571. Although the main controller 570 is illustrated as including one processor 571 in FIG. 6, the main controller 570 may include a plurality of processors. The processor 571 may be classified as any one of the sub-controllers described above.

The processor 571 may receive a signal, information, or data from a user terminal through the communication device 530. The user terminal may transmit signals, information or data to the cabin system 400.

The processor 571 may specify a user based on image data received from at least one of an internal camera and an external camera included in the imaging device.

The processor 571 may specify a user by applying an image processing algorithm to image data. For example, the processor 571 may specify the user by comparing the information received from the user terminal with the image data. For example, the information may include at least one of route information, body information, passenger information, luggage information, position information, preferred content information, preferred food information, disability information, and use history information of the user.

The main controller 570 may include an artificial intelligence agent 372. The artificial intelligence agent 572 may perform machine learning based on data obtained through the input device 510. The artificial intelligence agent 572 may control at least one of the display system 550, the cargo system 555, the seat system 560, and the payment system 565 based on a result of machine-learning.

The memory 540 is electrically connected to the main controller 570. The memory 540 may store basic data for a unit, control data for operation control of the unit, and input/output data. The memory 540 may store data processed by the main controller 570. The memory 540 may be configured as at least one of ROM, RAM, EPROM, flash drive, and hard drive in terms of hardware. The memory 540 may store various data for an overall operation of the cabin system 400, such as a program for processing or controlling the main controller 570. The memory 540 may be implemented integrally with the main controller 570.

The interface unit 170, 270, or 370 may exchange signals with at least one electronic device provided in a vehicle by wire or wirelessly. The interface unit 170, 270, or 370 may be configured as at least one of a communication module, a terminal, a pin, a cable, a port, a circuit, an element, and a device.

The power supply unit 590 may supply power to the cabin system 400. The power supply unit 590 may receive power from a power source (e.g., a battery) included in the vehicle and supply power to each unit of the cabin system 400. The power supply unit 590 may be operated according to a control signal provided from the main controller 570.

For example, the power supply unit 590 may be implemented as a switched-mode power supply (SMPS).

The cabin system 400 may include at least one printed circuit board (PCB). The main controller 570, the memory 540, the interface unit 170, 270, or 370, and the power supply unit 590 may be mounted on at least one printed circuit board.

The input device 510 may receive a user input. The input device 510 may convert the user input into an electrical signal. The electrical signal converted by the input device 510 may be converted into a control signal and provided to at least one of the display system 550, the cargo system 555, the seat system 560, and the payment system 565. At least one processor included in the main controller 570 or the cabin system 400 may generate a control signal based on an electrical signal received from the input device 510.

The input device 510 may include at least one of a touch input unit, a gesture input unit, a mechanical input unit, and a voice input unit. The touch input unit may convert the user's touch input into an electrical signal. The touch input unit may include at least one touch sensor to detect a user's touch input. According to an embodiment, the touch input unit may be integrally configured with at least one display included in the display system 550 to implement a touch screen. Such a touch screen may provide both an input interface and an output interface between the cabin system 400 and the user. The gesture input unit may convert the user's gesture input into an electrical signal. The gesture input unit may include at least one of an infrared sensor and an image sensor for detecting a user's gesture input. According to an embodiment, the gesture input unit may detect a user's 3D gesture input. To this end, the gesture input unit may include a light output unit that outputs a plurality of infrared rays or a plurality of image sensors. The gesture input unit may detect the user's 3D gesture input through a time of flight (TOF) method, a structured light method, or a disparity method. The mechanical input unit may convert a user's physical input (e.g., pressing or rotating) through a mechanical device into an electrical signal. The mechanical input unit may include at least one of a button, a dome switch, a jog wheel, and a jog switch. Meanwhile, the gesture input unit and the mechanical input unit may be integrally configured. For example, the input device 510 may include a gesture sensor and may include a jog dial device configured to drawn in and out from a portion of a peripheral structure (e.g., at least one of a seat, an armrest, and a door). When the jog dial device is in a flat state with a peripheral structure, the jog dial device may function as a gesture input unit. When the jog dial device protrudes relative to the peripheral structure, the jog dial device may function as a mechanical input unit. The voice input unit may convert the user's voice input into an electrical signal.

The voice input unit may include at least one microphone. The voice input unit may include a beam foaming MIC.

The imaging device 520 may include at least one camera. The imaging device 520 may include at least one of an internal camera and an external camera. The internal camera may capture an image in the cabin. The external camera may capture an image outside the vehicle. The internal camera may obtain an image in the cabin. The imaging device 520 may include at least one internal camera. Preferably, the imaging device 520 includes the number of cameras corresponding to the number of people who may get in. The imaging device 520 may provide an image obtained by an internal camera. At least one processor included in the main controller 570 or the cabin system 400 may detect the user's motion based on the image obtained by the internal camera, generate a signal based on the detected motion, and provide the generated signal to at least one of the display system 550, the cargo system 555, the seat system 560, and the payment system 565. The external camera may obtain an image outside the vehicle. The imaging device 520 may include at least one external camera. The imaging device 520 preferably includes the number of cameras corresponding to the boarding door. The imaging device 520 may provide an image obtained by an external camera.

At least one processor included in the main controller 570 or the cabin system 400 may obtain user information based on the image obtained by the external camera.

At least one processor included in the main controller 570 or the cabin system 400 may authenticate the user or obtain the user's body information (e.g., height information, weight information, etc.), the user's passenger information, luggage information of the user, and the like, based on the user information.

The communication device 530 may wirelessly exchange signals with an external device. The communication device 530 may exchange signals with an external device through a network or may directly exchange signals with an external device. The external device may include at least one of a server, a mobile terminal, and another vehicle. The communication device 530 may exchange signals with at least one user terminal. The communication device 530 may include at least one of an antenna, a radio frequency (RF) circuit capable of implementing at least one communication protocol, and an RF element to perform communication. According to an embodiment, the communication device 530 may use a plurality of communication protocols. The communication device 530 may switch a communication protocol according to a distance from a mobile terminal.

For example, the communication device may exchange signals with an external device based on cellular V2X (C-V2X) technology. For example, the C-V2X technology may include LTE-based sidelink communication and/or NR-based sidelink communication.

For example, the communication device may exchange signals with an external device based on IEEE 802.11p PHY/MAC layer technology and IEEE 1609 Network/Transport layer technology-based dedicated short range communications (DSRC) technology or wireless access in vehicular environment (WAVE) standard. DSRC (or WAVE standard) technology is a communication standard prepared to provide intelligent transport system (ITS) service through short-range dedicated communication between in-vehicle devices or between a roadside device and an in-vehicle device.

The DSRC technology may use a frequency of 5.9 GHz band and may be a communication method having a data transfer rate of 3 Mbps to 27 Mbps. IEEE 802.11p technology may be combined with IEEE 1609 technology to support DSRC technology (or WAVE standard).

In the present disclosure, the communication device may exchange signals with an external device using only one of the C-V2X technology or the DSRC technology. Alternatively, the communication device of the present disclosure may exchange signals with an external device by hybridizing the C-V2X technology and the DSRC technology.

The display system 550 may display a graphic object. The display system 550 may include at least one display device. For example, the display system 550 may include a publicly available first display device 410 and an individually available second display device 420.

The first display device 410 may include at least one display 411 for outputting visual content. The display 411 included in the first display device 410 may be implemented as at least one of a flat display, a curved display, a rollable display, and a flexible display.

For example, the first display device 410 may include a first display 411 positioned at the rear of the seat and configured to be drawn in and out of the cabin and a first mechanism for moving the first display 411. The first display 411 may be disposed in a slot configured in the seat main frame to be retractable. According to an embodiment, the first display device 410 may further include a flexible area control mechanism. The first display may be configured to be flexible, and a flexible area of the first display may be adjusted according to a position of the user. For example, the first display device 410 may include a second display positioned on the ceiling in the cabin and configured to be rollable and a second mechanism for winding or unwinding the second display. The second display may be configured to enable screen output on both sides. For example, the first display device 410 may include a third display positioned on the ceiling in the cabin and configured to be flexible and a third mechanism for folding or unfolding the third display. According to an embodiment, the display system 550 may further include at least one processor that provides a control signal to at least one of the first display device 410 and the second display device 420.

A processor included in the display system 550 may generate a control signal based on a signal received from at least one of the main controller 570, the input device 510, the imaging device 520, and the communication device 530.

A display region of the display included in the first display device 410 may be divided into a first region 411*a* and a second region 411*b*. The first region 411*a* may be defined as a content display region. For example, the first region 411 may display at least one of entertainment contents (e.g., movies, sports, shopping, music, etc.), video conferences, food menus, and graphic objects corresponding to an augmented reality screen. The first region 411*a* may display a graphic object corresponding to driving situation information of the vehicle. The driving situation information may include at least one of object information outside the vehicle, navigation information, and vehicle state information. The object information outside the vehicle may include information on the existence of an object, position information of the object, distance information between the vehicle and the object, and relative speed information between the vehicle and the object.

The navigation information may include at least one of map information, set destination information, route information according to the destination setting, information on various objects on a route, lane information, and current position information of the vehicle. The vehicle state information may include vehicle posture information, vehicle speed information, vehicle inclination information, vehicle weight information, vehicle direction information, vehicle battery information, vehicle fuel information, vehicle tire pressure information, and vehicle steering information, vehicle interior temperature information, vehicle interior humidity information, pedal position information, vehicle engine temperature information, and the like. The second region 411b may be defined as a user interface region. For example, the second region 411b may output an artificial intelligence agent screen.

According to an embodiment, the second region 411b may be located in a region divided by the seat frame. In this case, the user may view the content displayed in the second region 411b between the plurality of seats. According to an embodiment, the first display device 410 may provide holographic content. For example, the first display device 410 may provide holographic content for each of a plurality of users so that only the user who requested the content may view the corresponding content.

The second display device 420 may include at least one display. The second display device 420 may provide a display at a position where only individual passengers may check the display contents. For example, the display may be disposed on an armrest of the seat. The second display device 420 may display a graphic object corresponding to the user's personal information. The second display device 420 may include a number of displays corresponding to the number of passengers available to board. The second display device 420 may implement a touch screen by forming an interlayer structure with a touch sensor or integrally configured with the touch sensor. The second display device 420 may display a graphic object for receiving a user input of seat adjustment or room temperature adjustment.

The cargo system 555 may provide a product to the user according to the user's request. The cargo system 555 may be operated based on an electrical signal generated by the input device 510 or the communication device 530. The cargo system 555 may include a cargo box. The cargo box may be hidden in a portion of the bottom of the seat in a state in which the goods are loaded.

When an electrical signal based on a user input is received, the cargo box may be exposed as a cabin. The user may select a necessary product from among the goods loaded in the exposed cargo box. The cargo system 555 may include a sliding moving mechanism and a product pop-up mechanism for exposure of the cargo box according to a user input. The cargo system 555 may include a plurality of cargo boxes to provide various types of goods. In the cargo box, a weight sensor for determining whether to provide each product may be built therein.

The seat system 560 may provide the user with a seat tailored to the user. The seat system 560 may be operated based on an electrical signal generated by the input device 510 or the communication device 530. The seat system 560 may adjust at least one element of the seat based on the obtained user body data. The seat system 560 may include a user detection sensor (e.g., a pressure sensor) for determining whether the user is seated. The seat system 560 may include a plurality of seats on which a plurality of users may each be seated. Any one of the plurality of seats may be disposed to face at least another. At least two users inside the cabin may sit facing each other.

The payment system 565 may provide a payment service to the user. The payment system 565 may operate based on an electrical signal generated by the input device 510 or the communication device 530. The payment system 565 may calculate a price for at least one service used by the user and request that the calculated price be paid.

The vehicle projector device 100, 200, or 300, the vehicle cabin system 400, and the method (S100, S200, S300) for adjusting a position of a projection image of a projecting module of the present disclosure described above are not limited to the configurations and methods of the embodiments described above and all or some of the embodiments may be selectively combined to implement various modifications.

It will be apparent to those skilled in the art that the present disclosure may be embodied in other specific forms without departing from the spirit or essential characteristics thereof. Therefore, the detailed description should not be limitedly construed in all of the aspects, and should be understood to be illustrative. All changes and modifications that fall within the metes and bounds of the claims, or equivalents of such metes and bounds are therefore intended to be embraced by the appended claims.

INDUSTRIAL AVAILABILITY

The present disclosure may be applied to a vehicle projector device.

The invention claimed is:

1. A vehicle projector device installed inside a vehicle, the vehicle projector device comprising:
    a projecting module that is installed inside the vehicle to be rotatable and enables adjustment of a protrusion area to project an image toward a ceiling and rear of an interior of the vehicle; and
    a housing having an accommodating portion in which the projecting module is installed,
    wherein the housing includes a housing cover installed to be rotatable at an upper surface of the housing to enable opening and closing of the accommodating portion.

2. The vehicle projector device of claim 1, wherein the housing further includes a rotating mirror unit installed in the housing and having a rotatable mirror unit for reflecting the image projected from the projecting module toward a front or rear of the vehicle, the rotating mirror unit,
    wherein the rotating mirror unit includes a button connected to the mirror unit to be linearly movable in one direction to enable a rotational movement of the mirror unit.

3. The vehicle projector device of claim 2, wherein the rotating mirror unit includes:
    a rotating shaft connected to one side of the mirror unit to form a rotation center during rotation of the mirror unit;
    a guide rail configured on one surface of the button and having a guide groove configured in a direction intersecting one direction in which the button linearly moves; and
    a rotating link rotatably installed between the rotating shaft and the guide groove and rotating by a linear movement of the button to transmit rotational force to the rotating shaft.

4. The vehicle projector device of claim 3, wherein the rotating link includes:
    an accommodating hole configured on one side of the rotating link to rotatably accommodate one side of the rotating shaft; and
    a guide protrusion configured to protrude from the other side of the rotating link and installed in the guide groove.

5. The vehicle projector device of claim 4, wherein a button movement guide for enabling the button to move in one direction by a predetermined distance is installed inside the housing, and, according to the movement of the button in the button movement guide, the guide protrusion moves up and down in the guide groove and the rotating link rotates together with the rotating shaft.

6. The vehicle projector device of claim 2, wherein a button movement guide enabling the button to move in one direction by a predetermined distance is installed inside the housing.

7. The vehicle projector device of claim 1, further comprising:
a vehicle controller configured to obtain vehicle-related information;
an interface unit configured to receive the obtained vehicle-related information; and
a projector controller configured to receive the vehicle-related information from the interface unit and control an image protrusion direction of the projecting module.

8. The vehicle projector device of claim 7, wherein the vehicle-related information includes at least one of seat position information of the vehicle, screen position information for light irradiation, and passenger-related information.

9. The vehicle projector device of claim 1, further comprising an armrest having a top cover, wherein the projecting module is installed in the armrest to be rotatable and the housing is installed on the top cover.

10. The vehicle projector device of claim 1, further comprising:
a rotating support configured to rotatably support the projecting module and disposed at a position inside the vehicle.

11. The vehicle projector device of claim 10, wherein a rotating bracket configured to rotate in one direction intersecting an inner periphery of the rotating support, as a rotation axis, and support the projecting module installed in the periphery of the rotating support.

12. The vehicle projector device of claim 11, wherein rotating support bosses forming a rotation center are provided on both sides of the rotating bracket, and rotation holes for rotatably accommodating the rotating support bosses are provided on both sides of the rotating support.

13. The vehicle projector device of claim 12, wherein a step motor is installed on an inner periphery of the rotating support boss to enable rotation of the rotating bracket.

14. A vehicle cabin system comprising:
the vehicle projector device according to claim 1; and
a plurality of seats to which the projector device is connected.

15. A vehicle projector device installed inside a vehicle, the vehicle projector device comprising:
an armrest having a top cover; and
a projecting module that is installed in the armrest to be rotatable and enables adjustment of a protrusion area to project an image toward a ceiling and rear of an interior of the vehicle;
wherein the armrest further includes a body having a projector accommodating space in which the projecting module is installed, and
the top cover of the armrest is configured such that at least a portion thereof is rotatably opened by a user's manual operation.

16. The vehicle projector device of claim 15, wherein the top cover of the armrest includes:
a first side cover installed on the body to form a portion of the top cover and rotating about one side of the body; and
a second side cover installed on the body to form another portion of the top cover and rotating about the other side of the body.

17. The vehicle projector device of claim 16, wherein the armrest further includes an opening button installed on the body, pressing the first and second side covers to form a top cover surface of the armrest, and rotated by releasing the pressing of the first and second side covers by a user's manual operation to enable opening of the projector accommodating space.

18. The vehicle projector device of claim 15, further comprising:
a tilt mirror unit installed on the body and disposed to be inclined by a predetermined angle with respect to the projecting module so that a path of an image projected by the projecting module is changed toward the ceiling of the interior of the vehicle.

19. The vehicle projector device of claim 15, further comprising:
a lifting member configured to lift and lower the projecting module so that a relative distance between the projecting module and the body is adjusted to project an image toward the rear of the interior of the vehicle.

20. The vehicle projector device of claim 19, wherein the lifting member includes:
a bracket installed on at least one surface of the projecting module to support the projecting module; and
a distance adjusting link rotatably installed between the bracket and the body to adjust a relative distance between the bracket and the body.

21. The vehicle projector device of claim 20, wherein the lifting member further includes a step motor installed between the body and the distance adjusting link to adjust a rotation angle of the distance adjusting link.

22. A vehicle cabin system comprising:
the vehicle projector device according to claim 15; and
a plurality of seats to which the projector device is connected.

23. A method for adjusting a projection image position, as a method for adjusting a projection image position of a projecting module installed inside a vehicle, the method comprising:
checking a front seat, a back seat and a current position;
pressing a button of a projecting module;
adjusting a position of a projection image of the projecting module when the button is pressed; and
when the button is not pressed, maintaining a mirror unit angle at the current position and turning off the projecting module.

24. The method of claim 23, further comprising:
adjusting the projection position of the image of the projecting module to be adjusted to a ceiling of the vehicle and turning on the projecting module, when the button is pressed and the front seat is laid down; and
adjusting the projection position of the image of the projecting module to be projected to the a rear of the vehicle and turning on the projecting module, when the button is pressed and the back seat is folded.

25. The method of claim 23, further comprising:
turning on the projecting module as a top cover of the armrest is opened when the button is pressed and the front seat is laid down; and
turning on the projecting module after the position is moved to a set value of a projection position of the image of the projecting module when the button is pressed and the back seat is folded.

* * * * *